US012225878B2

(12) United States Patent
Lipscomb et al.

(10) Patent No.: US 12,225,878 B2
(45) Date of Patent: Feb. 18, 2025

(54) AIRBORNE DUST REDUCING GRANULAR ABSORBENT BLENDS

(71) Applicant: Pioneer Pet Products, LLC, Cedarburg, WI (US)

(72) Inventors: John M. Lipscomb, Cedarburg, WI (US); Omar I. Rodriguez, Cedarburg, WI (US); Chad C. Berge, Menomonee Falls, WI (US)

(73) Assignee: Pioneer Pet Products, LLC, Cedarburg, WI (US)

(*) Notice: Subject to any disclaimer, the term of this patent is extended or adjusted under 35 U.S.C. 154(b) by 287 days.

(21) Appl. No.: 15/510,052

(22) PCT Filed: Nov. 23, 2015

(86) PCT No.: PCT/US2015/062233
§ 371 (c)(1),
(2) Date: Mar. 9, 2017

(87) PCT Pub. No.: WO2016/081953
PCT Pub. Date: May 26, 2016

(65) Prior Publication Data
US 2017/0245460 A1    Aug. 31, 2017

Related U.S. Application Data

(60) Provisional application No. 62/083,162, filed on Nov. 21, 2014.

(51) Int. Cl.
*A01K 1/015*    (2006.01)
*B01D 39/18*    (2006.01)
(Continued)

(52) U.S. Cl.
CPC .......... *A01K 1/0154* (2013.01); *A01K 1/0152* (2013.01); *A01K 1/0155* (2013.01);
(Continued)

(58) Field of Classification Search
CPC .. A01K 1/0152; A01K 1/0155; A01K 1/0154; B01J 20/3028; B01J 20/2803;
(Continued)

(56) References Cited

U.S. PATENT DOCUMENTS 4,478,857 A    10/1984  Stauss
5,196,473 A *  3/1993  Valenta ................ A01K 1/0154
                                              252/383
(Continued)

FOREIGN PATENT DOCUMENTS

DE    4424946    1/1996
EP    0 716 806  6/1996
(Continued)

OTHER PUBLICATIONS

Licata et al. "Determination of Formulation and Processing Factors Affecting Slowly Digestible Starch, Protein Digestibility and Antioxidant Capacity of Extruded Sorghum-Maize Composite Flour", International Journal of Food Science and Technology, vol. 49, No. 5, Dec. 23, 2013, pp. 1408-1419.
(Continued)

*Primary Examiner* — Jeffrey R Larsen
(74) *Attorney, Agent, or Firm* — Boyle Fredrickson S.C.

(57) ABSTRACT

A multicomponent granular absorbent blend formed of at least a plurality of components with at least one of the components formed of smectite-containing, preferably bentonite-containing, absorbent granules, and at least one other of its components formed of absorbent granules comprised of an extrudate. Such an extruded-containing absorbent granule component can be a component formed of extruded pellets covered with an outer absorbent coating preferably composed of smectite, more preferably bentonite, and/or can be a component formed of extruded pellets used without any such smectite, preferably bentonite, outer coating producing
(Continued)

uncoated absorbent granules which also are dust-adhering thereby reducing airborne dust in the multicomponent blend. Such a component composed of uncoated dust-adhering absorbent granules can be formed of extruded splayed pellets having at least one lobe and/or fibrillated tendrils enhancing both absorption and dust pickup in the multicomponent blend.

36 Claims, 11 Drawing Sheets

(51) Int. Cl.
| | |
|---|---|
| *B01D 39/20* | (2006.01) |
| *B01J 20/12* | (2006.01) |
| *B01J 20/16* | (2006.01) |
| *B01J 20/24* | (2006.01) |
| *B01J 20/28* | (2006.01) |
| *B01J 20/30* | (2006.01) |
| *B01J 20/32* | (2006.01) |

(52) U.S. Cl.
CPC ......... *B01D 39/18* (2013.01); *B01D 39/2072* (2013.01); *B01J 20/12* (2013.01); *B01J 20/165* (2013.01); *B01J 20/24* (2013.01); *B01J 20/2803* (2013.01); *B01J 20/3007* (2013.01); *B01J 20/3293* (2013.01)

(58) Field of Classification Search
CPC ................ B01J 20/3293; B01J 20/3042; B01J 20/28019; B01J 20/28023; B01J 20/3295; B01J 2/003; B01J 2/20
USPC .......................................... 119/171, 172, 173
See application file for complete search history.

(56) References Cited

U.S. PATENT DOCUMENTS

| | | | |
|---|---|---|---|
| 5,735,232 A | | 4/1998 | Lang et al. |
| 5,970,916 A | * | 10/1999 | Yoder .................. A01K 1/0155 119/173 |
| 6,220,206 B1 | | 4/2001 | Sotillo et al. |
| 6,403,549 B1 | * | 6/2002 | De Lima ................ A21D 8/042 435/187 |
| 8,187,423 B1 | * | 5/2012 | Glenn ................... B29C 70/443 162/141 |
| 8,349,342 B2 | * | 1/2013 | Lobee ..................... A23P 30/30 424/401 |
| 2007/0017453 A1 | | 1/2007 | Fritter et al. |
| 2007/0289543 A1 | * | 12/2007 | Petska .................. A01K 1/0154 119/173 |
| 2009/0217882 A1 | | 9/2009 | Jenkins |
| 2010/0269758 A1 | | 10/2010 | Fuchshuber |
| 2011/0185977 A1 | * | 8/2011 | Dixon .................... A01K 29/00 119/173 |
| 2011/0253055 A1 | * | 10/2011 | Tang .................... A01K 1/0154 119/173 |
| 2012/0202236 A1 | * | 8/2012 | Jollez ................... A01K 1/0152 435/28 |

FOREIGN PATENT DOCUMENTS

| | | |
|---|---|---|
| JP | S62 143659 | 6/1987 |
| JP | S62 208246 | 9/1987 |
| WO | 2011094022 | 8/2011 |
| WO | 2011134074 | 11/2011 |

OTHER PUBLICATIONS

Mahasukhonthachat et al., "Kinetics of Starch Digestion and Functional Properties of Twin-Screw Extruded Sorghum", Journal of Cereal Science, Academic Press Ltd., vol. 51, No. 3, May 1, 2010, pp. 392-401.

Katleen J.R. Vallons et al., "Promoting Structure Formation by High Pressure in Gluten-Free Flours", LWT—Food Science and Technology, vol. 44, No. 7, Sep. 1, 2011, pp. 1672-1680.

Rokey et al., "Feed Extrusion Process Description," Revista Brasileira de Zootecnia, v. 39, p. 510-518, 2010.

Meshram et al. "Simultaneous Gelatinization and Drying of Maize Starch in a Single-Screw Extruer", Drying Technology, vol. 27, No. 1, Jan. 2, 2009 (Jan. 2, 2009), pp. 113-122.

\* cited by examiner

AIRBORNE DUST REDUCING GRANULAR ABSORBENT BLENDS

FIELD

The present invention is directed to granular absorbent blends and more particularly to a multicomponent granular absorbent blend well suited for use as litter that is a mixture of at least a plurality of different blend components, including an airborne dust-suppressing component composed of dust-adhering granules to which dust in the blend sticks reducing the amount of dust that becomes airborne during use of the blend.

BACKGROUND

Conventional scoopable or pourable animal or cat litter has been around for many years as its principal ingredient, bentonite, is highly absorbent and produces clumps when wetted with urine or liquid fecal matter that are easy to scoop up and dispose. The granules of bentonite in such litter are capable of absorbing nearly five times its weight of water with the granules swelling as water is absorbed. As the bentonite granules absorb the water and swell, the wetted outer granule surfaces stick together forming clumps of pellets that can easily be scooped up and disposed of.

Despite complaints about being too heavy, as bentonite typically has a bulk density of 50 pounds per cubic foot or more, bentonite has been so inexpensive in the past that its absorption and clumping benefits outweighed any inconvenience caused by its excessive weight causing its widespread adoption. Unfortunately, bentonite's cost has significantly risen in recent times primarily due to the seemingly ever increasing cost of freight to transport it.

Efforts have been made to reduce the cost of bentonite litter by adding lower cost fillers such as silica, e.g., quartz, limestone, other types of less absorbent or non-absorbent clay, and zeolite, e.g., calcium carbonate, in order to reduce the amount of bentonite used in the litter primarily in order to reduce freight costs. Other cost-reduction efforts have included locating packaging and/or filling sites where, such lower cost fillers are added to the litter, closer in proximity to retailers that sell the litter.

While some of these fillers, such as zeolite, are absorptive, virtually all weight and cost reducing fillers in use today, including zeolite, can and typically does significantly detract from the overall performance of bentonite litter. Since the vast majority of these fillers are inert, they not only reduce the total amount and weight of bentonite present in the litter, they also undesirably reduce the total absorptive capacity of the litter. These fillers also can and often do significantly reduce the ability of the litter to clump producing "crumbly" litter clumps when wetted by pet urine that typically possess clump retention far less than the normal 90-92% clump retention litters composed substantially completely of bentonite typically possess.

In addition to such fillers, additives have also been added that reduce odor because bentonite retains the water in the urine and fecal matter it absorbs for so long, it provides a ripe breeding ground for odor-causing bacteria to thrive. While such additives can provide improved odor control, they often are expensive increasing the overall cost of the litter while frequently also reducing litter absorption and clumping properties.

Indeed, because of the rather crumbly nature of the commonly available granular bentonite litter blends that include such fillers and additives, the act of scooping up even one litter clump during litter pan cleaning can cause one or more small pieces of contaminated litter to break off the clump and be left in the litter pan. Over time, repeated scooping and cleanings can result in as much as 15% or more dirty or contaminated litter being left behind in the pan. As the amount of dirty or contaminated litter builds up more and more, odors can become so strong that they not only permeate throughout but they can also cause cats to stop using the contaminated litter pan and soil the house. House soiling is highly undesirable as it is the single most common reason for cats being given to humane shelters and societies.

When the ratio or percentage of bentonite becomes too low, clumping can become so adversely affected that binders or clumping agents, such as gums, starches, pectin, agar, gelatin, alginates, carrageenan, and protein, need to be added. While such binders and clumping agents improve litter clumping, they do not appreciably improve absorption and can actually increase bacterial growth and odor.

Conventional bentonite clumping animal or cat litter is made of granules or particles of bentonite, e.g., sodium bentonite, zeolite, e.g. calcium carbonate, silica, e.g., quartz, clay, and/or baking soda that produces a scoopable and/or pourable litter mixture that is packaged in retail storage containers, e.g. bags, buckets, boxes or the like that clumps when wetted such as by urine or liquid fecal matter. The principal active ingredient in such cat litter is bentonite, typically in the form of sodium bentonite and/or calcium bentonite, because it absorbs up to five times its weight in water while also sticking together when wetted producing clumps of urine.

Unfortunately, while conventional scoopable bentonite clumping litter has enjoyed longstanding commercial success, it is heavy, produces crumbly clumps, and swells and gels when wetted producing lower retention clumps (between 90-92% clump retention) that frequently stick to the bottom and/or sides of a litter box in which the litter is used requiring soaking in disinfectant and/or water in order to be manually wiped off. Besides producing crumbly clumps that stick to the litter box and undesirably require the stuck-on clump residue to be manually removed, such conventional scoopable bentonite clumping litter is heavy and quite often odorous, especially if urine and fecal matter clumps are not removed from the litter box for a long time. Conventional scoopable bentonite clumping litter has a bulk density of 50 pounds per cubic foot or more making it costly to ship, undesirably heavy to lift and maneuver, in addition to having a relatively high per pound cost to produce.

While attempts have been made in the past to reduce both the weight and cost of conventional scoopable bentonite clumping litters by adding fillers, such as sawdust, wood shavings, cellulose, limestone, calcium bentonite, non-swelling clays, silica, and other fillers (inert materials), such fillers inevitably detract from the overall performance of the litter. In the past, gums, starches, pectin, agar, gelatin, alginates, carrageenan, and protein have been added to conventional scoopable bentonite clumping litters to help promote clumping particularly where the amount of bentonite used has been reduced by the use of fillers to the point where the clumping properties of the litter have been adversely affected. What is needed is a conventional scoopable bentonite clumping litter blended with a granular material that not only reduces the overall cost but which also improves litter performance.

While attempts have been made in the past to produce a lighter, more natural, and even biodegradable animal litter, improvements nonetheless remain desirable. Conventional granular clay-based and gel-based litters are relatively heavy, cost a considerable amount of money to ship, and are often a burden for purchasers to carry. While many so-called natural animal litters have been introduced into the marketplace, they can be nearly as heavy as conventional litter, typically absorb far less urine than conventional litter, can produce their own unpleasant odor, and many times do not clump well, if they even clump at all. As a result, such so-called natural animal litters have struggled to achieve significant commercial success.

SUMMARY

The present invention is directed to multicomponent granular absorbent blends formed by blending a plurality of different types of granular absorbents with at least one type of granular absorbent composed of dust-containing or dust-forming liquid absorbent granules each at least partially formed or made of dust-containing and/or dust-forming liquid absorbent material and at least one other type of granular absorbent being composed of dust-adhering liquid absorbent granules formed or made of a liquid absorbent organic material. In a preferred multicomponent blend embodiment and method, each dust-adhering liquid absorbent granule is formed of extrudate preferably formed of a pellet extruded from one or more cereal grains. In one such preferred multicomponent blend, at least a plurality of pairs of the dust-adhering liquid absorbent granule are each formed of a pellet extruded from one or more cereal grains that is splayed during or from extrusion producing a splayed extruded liquid absorbent pellet having at least one and preferably at least a plurality of liquid absorbing lobes extending outwardly from a splayed liquid absorbent pellet body that is larger than each lobe. In another such preferred multicomponent blend, at least a plurality of pairs of the dust-adhering liquid absorbent granule are each formed of splayed extruded liquid absorbent pellets which each further have at least a plurality of liquid wicking tendrils extending outwardly from one or both of the splayed liquid absorbent pellet body and lobes.

The at least one type of granular absorbent composed of dust-containing or dust-forming liquid absorbent granules each at least partially formed or made of dust-containing and/or dust-forming liquid absorbent material can include (a) at least a plurality of liquid absorbent granules substantially completely formed or made of the dust-containing and/or dust-forming liquid absorbent material, (b) at least a plurality of liquid absorbent granules formed or made of inner lightweight cores lower in density than the dust-containing and/or dust-forming liquid absorbent material with each inner lightweight core at least partially covered in an outer layer or outer coating of the dust-containing and/or dust-forming liquid absorbent material, and/or (c)(i) at least a first plurality of liquid absorbent granules substantially completely formed or made of the dust-containing and/or dust-forming liquid absorbent material, and (ii) at least a second plurality of liquid absorbent granules formed or made of inner lightweight cores lower in density than the dust-containing and/or dust-forming liquid absorbent material with each inner lightweight core at least partially covered in an outer layer or outer coating of the dust-containing and/or dust-forming liquid absorbent material.

Such a multicomponent granular absorbent blend of the present invention emits less airborne dust as a result of at least some of dust particles formed of dust-containing and/or dust-forming liquid absorbent material in the multicomponent blend being picked up and retained by dust-adhering granules in the blend reducing the amount or number of dust particles free to become airborne during mixing of the blend, packaging of the blend, shaking of the blend, pouring of the blend and/or scooping of the blend. Such dust-adhering granules are not only liquid absorbing but also act as "dust magnets" by physically, mechanically and/or electrostatically attracting and picking up at least some of the dust particles in the blend. Such dust-adhering granules preferably also help prevent settling and/or stratification of the different types of absorbent granules in the blend through mechanical engagement and/or electrostatic attraction.

The present invention preferably also is directed to a granular absorbent blend formed by blending a plurality of different types of granular absorbents with at least one type of the granular absorbents comprised of a smectite and at least one other type of the granular absorbents comprised of an extrudate that is extruded from a starch mixture that can be blended "as is" in the form extruded or after a material different than the extrudate has been applied thereto forming an outer surface of the extrudate comprised of material different than the extrudate. Such a granular absorbent blend in accordance with the present invention can be blended from a plurality of pairs, i.e., at least three, of different types of granular absorbents with at least one of the granular absorbents comprised of smectite and at least one of the other granular absorbents comprised of extrudate in the form of an extruded granular absorbent that is extruded from a starch-containing mixture, e.g., admixture.

In one granular absorbent blend, the granular absorbent blend is comprised of a first granular absorbent comprised of smectite, a second granular absorbent comprised of one extruded granular absorbent, and a third granular absorbent comprised of another extruded granular absorbent with one of the extruded granular absorbents having an outer surface, layer, coating or film comprised of a material different than the starch mixture from which extruded. A granular absorbent blend in accordance with the present invention can be blended of more than three different types of granular absorbents with at least one of the types of granular absorbent comprised of smectite and at least one other of the types of granular absorbent comprised of extruded granular absorbent. Another granular absorbent blend in accordance with the present invention can be blended of more than three different types of granular absorbents with at least one of the types of granular absorbent comprised of smectite, at least one other of the types of granular absorbent comprised of an extruded granular absorbent, and at least another of the types of granular absorbent comprised of another extruded granular absorbent. In one such preferred granular blend embodiment formed or made of a blend having at least two types of extruded granular absorbents, one of the granular absorbents can be extruded from a starch mixture not containing any material different than the starch mixture and another one of the granular absorbents can have an outer surface with a film, coating, or outer layer comprised of material different than the starch mixture.

Where the extruded granular absorbent has an exterior or outer surface comprised of different material, the different material can be applied after extrusion in a manner that forms an outer surface comprised of at least some of the different material. Where the extruded granular absorbent has an exterior or outer surface comprised of different material, the different material can be applied via dusting, coating, spraying, misting, agglomerating, or using another suitable outer surface application process. The extruded granular absorbent can also be extruded from a starch-containing mixture that also includes such a different material that is a material different than the starch-containing mixture producing extruded granular absorbent having an outer surface comprised of a film, coating, or outer layer formed during extrusion that is comprised of the different material.

A preferred granular absorbent blend component well suited for use in a multicomponent blend of the present invention is composed of uncoated absorbent granules formed of uncoated extruded pellets used uncoated which also advantageously are dust-adhering thereby reducing airborne dust in the multicomponent blend when poured, stirred, shaken or otherwise agitated. One preferred uncoated absorbent granule blend component includes at least a plurality of pairs of splay-extruded pellets preferably used uncoated having one or more liquid-absorbing lobes and one or fibrillated liquid-wicking tendrils which not only facilitate dust adherence but which also mechanically and electrostatically engage adjacent bentonite containing and bentonite coated absorbent granules in the multicomponent blend advantageously preventing settling out of any one of the blend component.

These and other objects, features and advantages of this invention will become apparent from the following detailed description of the invention and accompanying drawings.

DRAWINGS

Preferred exemplary embodiments of the invention are illustrated in the accompanying drawings in which like reference numerals represent like parts throughout and in which.

Figure 1:
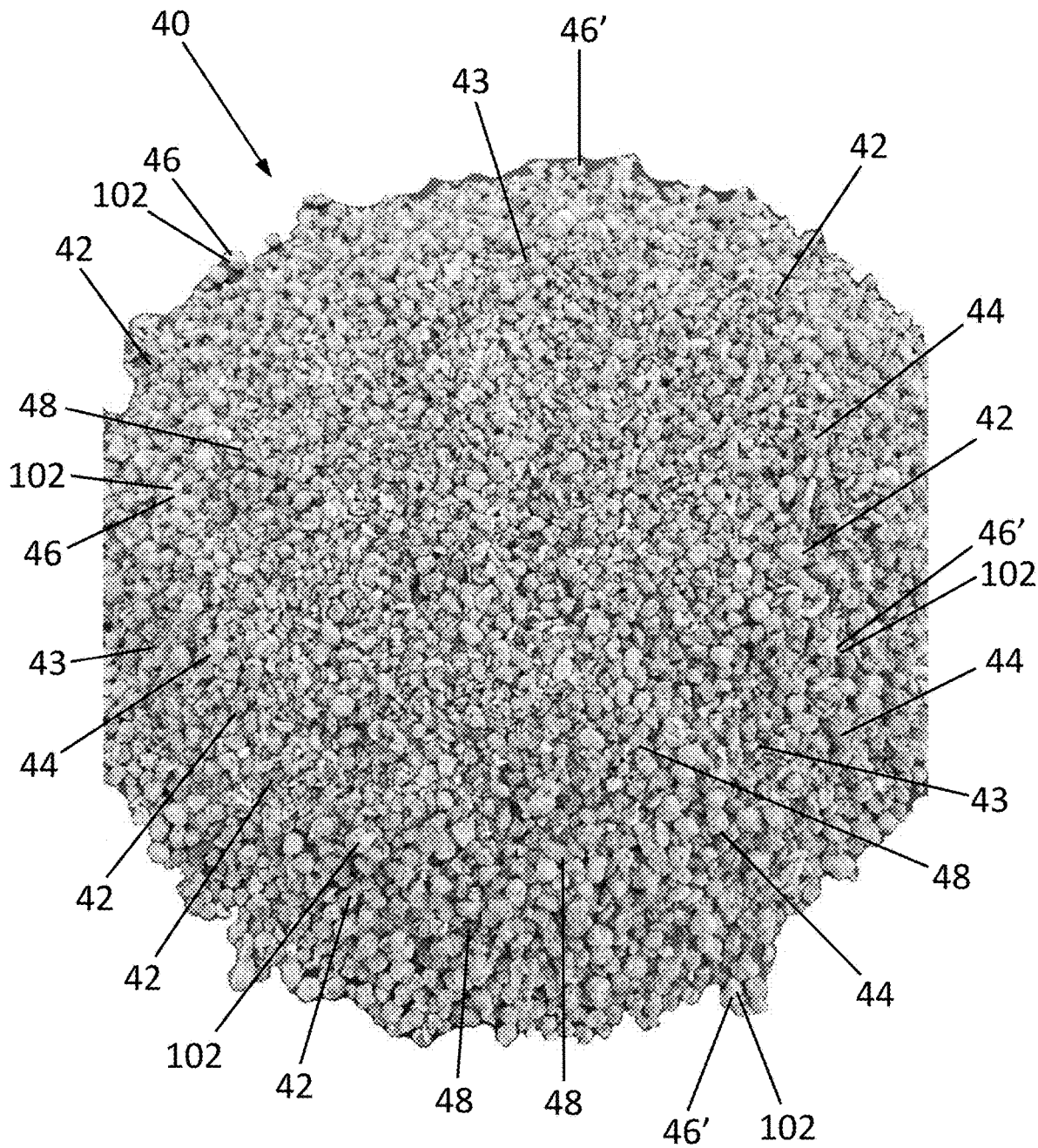
FIG. 1 is a color photograph of a preferred multicomponent granular absorbent blend of the present invention composed of at least a plurality of pairs of different types of absorbent granules.

Before explaining one or more embodiments of the present invention in detail below, it is to be understood that the invention is not limited in its application to the details of the construction and arrangement of that which is set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 2:
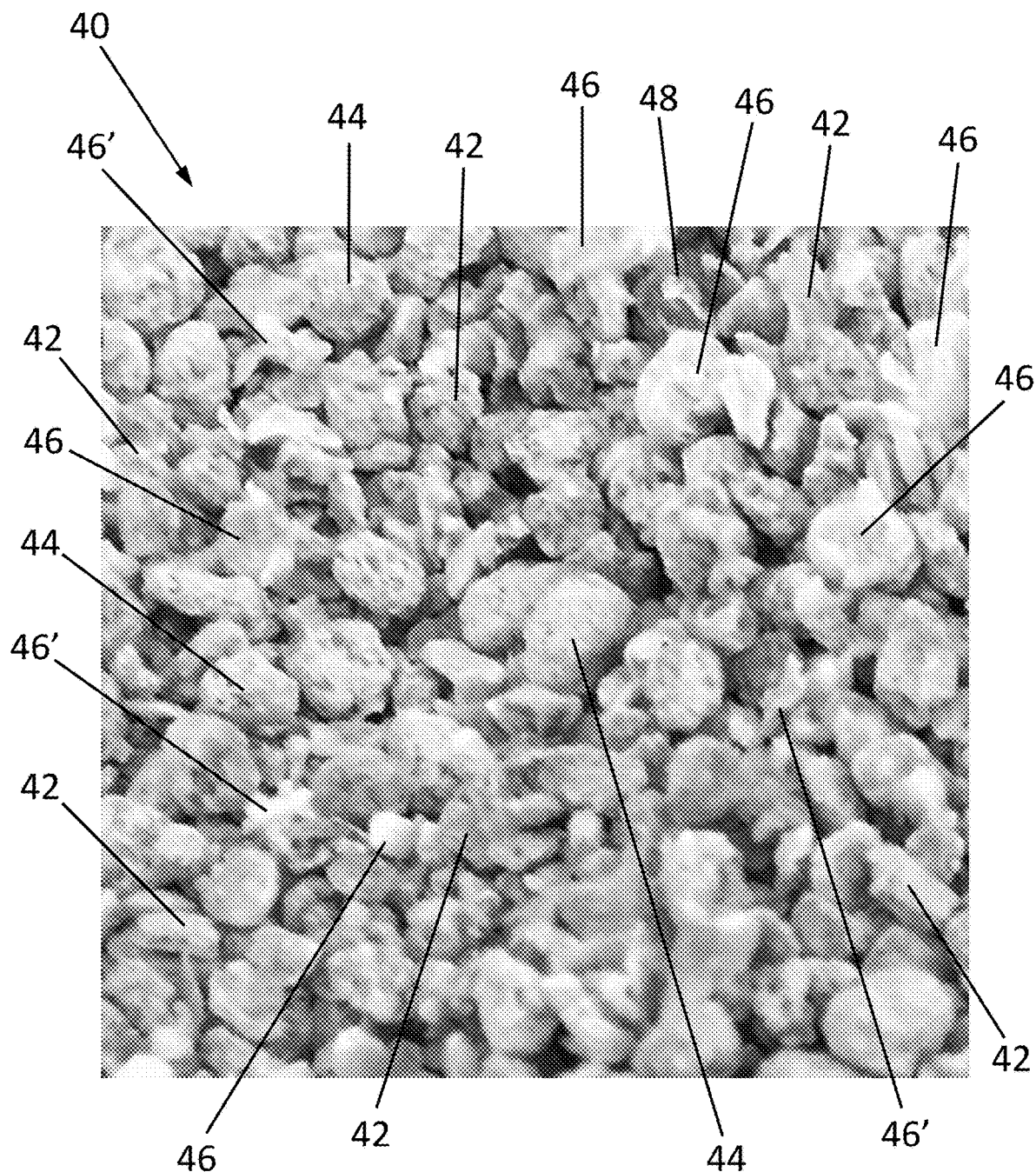
FIG. 2 is an enlarged portion of the color photograph of the granular absorbent blend of FIG. 1 depicting in more detail each one of the plurality of pairs of different types of absorbent granules and components used in the blend.

With initial reference to FIGS. 1 and 2, the present invention is directed to a method of making a multicomponent granular absorbent blend 40 and is also directed to a resultant multicomponent granular absorbent blend 40 formed of at least a plurality of different blend components 50, 52, 78 with at least one of the blend components 78 being a dust-suppressing blend component 78 composed of granules 46 formed of or from an extrudate that are dust-adhering when mixed with one or more other blend components 50, 52 that can contain, generate or otherwise create dust particles 43 of one hundred microns or smaller in size with the dust-adhering granules 46 picking up at least some of the dust particles 43 in the resultant multicomponent blend 40 thereby advantageously reducing an amount or number of the dust particles 43 in the blend 40 that remain free or unattached and capable of becoming airborne. Such dust-adhering granules 46 preferably are liquid-absorbent and provide "dust magnets" in the multicomponent blend 40 by causing dust particles 43 to become attached to the granules 46 thereby advantageously reducing airborne dust by reducing the amount or number of unattached dust particles 43 in the blend 40 which can become airborne during use of the blend 40, including when the blend 40 is poured. Such a multicomponent granule absorbent blend 40 made with a dust-suppressing blend component 78 composed of dust-adhering absorbent granules 46 of the present invention results in significantly less dust particles 43 becoming airborne during pouring, dumping or scooping of the blend 40 due to the dust-adhering granules 46 in the blend 40 picking up or collecting a substantial number of the total dust particles 43 in the blend 40 before pouring, dumping or scooping occurred.

With continued reference to FIGS. 1 and 2, a preferred multicomponent granular absorbent blend 40 of the present-invention is a low-dust litter 45, preferably a low-dust cat litter, low-dust animal litter, and/or low-dust pet litter, of the present invention formed of at least a plurality of blend components, at least one of which is a dust-suppressing component 78 of the present invention containing at least a plurality of pairs, i.e., at least three, of the dust-adhering granules 46 to which dust particles 43 in the resultant litter 45 adhere the amount or number of dust particles 43 in the resultant litter 45 which can become airborne when the litter 45 is poured into a litter pan or scooped to clean litter 45 in the pan during use. As discussed in more detail below, a multicomponent granular absorbent blend 40 of the present invention, including when used as low-dust litter 45, preferably contains at least a plurality of pairs, i.e., at least three, dust-adhering granules 46 per cubic centimeter volume of the multicomponent blend 40 used as the low-dust litter, with the dust-adhering granules 46 used in the litter 45 which make up the blend 40 each possessing a dust carrying capacity or a dust pickup capacity of at least 0.05 grams, preferably at least 0.07 grams, and more preferably at least 0.09 grams, of dust particles 43 per gram of dust-adhering absorbent granules 46 in such a multicomponent blend 40 formulated for use as litter 45. In other words, a multicomponent blend 40 of the present invention, particularly when used as litter 45, contains at least a plurality of pairs, i.e., at least three, dust-adhering granules 46 per cubic centimeter volume of the blend 40 with the dust-adhering granules 46 used in the blend 40 being able to collect and retain at least 0.05 grams, preferably at least 0.07 grams, and more preferably at least 0.09 grams, of dust particles 43 per gram of dust-adhering granules 46 used in the blend 40, including when used as litter 45.

Such a preferred multicomponent granular absorbent blend 40 of the present invention containing such a dust-suppressing blend component 78 of dust-adhering granules 46 advantageously reduces the amount or number of airborne dust particles 43 less than one hundred microns in size but which have a size of one micron or greater by at least one-half of one percent for every one percent of the dust-adhering granules 46 present in the blend 40 or low-dust litter 45 by weight of the blend 40 or low-dust litter 45. In one such preferred blend 40 used as low-dust litter 45, the dust-adhering granules 46 used in the dust-suppressing blend component 78 have a dust carrying or dust pickup capacity sufficient to reduce the amount of airborne dust particles 43 having a size greater than one micron but no greater than one hundred microns that become airborne when the blend 40 or litter 45 is poured by at least one percent for every one percent in weight that the blend 40 or litter 45 contains of the dust-adhering granules 46.

FIGS. 1 and 2 illustrate a preferred multicomponent granular absorbent blend 40 that is formed of at least a plurality of pairs, i.e., of blend components 50, 52 and 78 with each blend component 50, 52 and 78 formed of a corresponding different type of absorbent granule 42, 44, 46 and the blend 40 containing at least one dust-suppressing blend component 78 composed of at least a plurality of pairs of dust-adhering absorbent granules 46 along with at least one and preferably at least a plurality of other types of blend components 50 and/or 52 of which at least one of the blend components 50 and/or 52 is composed of at least a plurality of pairs of absorbent granules 42 and/or 44 made of, formed with and/or otherwise composed of a liquid absorbent material which has, carries, contains, creates or otherwise forms dust particles 43, including during blending, packaging, transport, storage and use of the resultant multicomponent blend 40, which can become airborne when the blend 40 is mixed, shaken, dumped, poured, scooped or otherwise agitated. While the multicomponent blend 40 shown in FIGS. 1 and 2 is at least a three part or three component blend formed of at least a plurality of pairs of, i.e., at least three, blend components 50, 52 and 78, a multicomponent blend 40 and method of making such a multicomponent blend 40 in accordance with the present invention is intended to encompass or apply to multicomponent blends having a plurality of blend components 50 and/or 52 and 78 but less than three blend components with such multicomponent blends of the present invention at least having a dust-suppressing blend component 78 containing at least a plurality of pairs of, i.e., at least three, dust-suppressing absorbent granules 46 and having at least one other blend component 50 and/or 52 containing at least a plurality of pairs of absorbent granules 42 and/or 44 at least partially composed of an absorbent material which has, carries, contains, creates or otherwise forms dust particles 43 such that the resultant blend 40 contains such dust particles 43.

With continued reference to FIGS. 1 and 2, in a preferred multicomponent blend 40 and preferred method of making such a multicomponent blend 40, absorbent granules 42 and 44 of respective blend components 50 and 52 are at least partially formed or composed of or from a dust containing, dust carrying, dust creating or dust forming liquid-absorbent material that preferably is water absorbent and which can be an inorganic dust containing, dust carrying, dust creating or dust forming liquid-absorbent material that preferably is water absorbent, and absorbent granules 46 of dust-suppressing blend component 78 is formed or composed of a liquid-absorbent material, e.g., water-absorbent material, which preferably is a liquid-absorbent organic material, e.g., water-absorbent organic material, formed or composed of or from an extrudate. In one preferred multicomponent blend 40 and preferred method of making such a multicomponent blend 40, absorbent granules 42 and 44 of respective blend components 50 and 52 are at least partially formed or composed of or from a dust containing, dust carrying, dust creating or dust forming liquid-absorbent material that preferably is water absorbent and which can be an inorganic dust containing, dust carrying, dust creating or dust forming liquid-absorbent material that preferably is water absorbent, and absorbent granules 46 of dust-suppressing blend component 78 is formed or composed of a liquid-absorbent material, e.g., water-absorbent material, which preferably is a liquid-absorbent organic material that preferably is both water absorbent and oil absorbent, formed or composed of or from an extrudate. In one such method and preferred multicomponent blend 40, dust-adhering absorbent granules 46 of dust-suppressing blend component 78 is made or composed of or from a starch-containing extrudate, preferably of or from extruded starch-containing pellets 84, as discussed in more detail below, and the dust containing, dust carrying, dust creating or dust forming liquid-absorbent material from or of which absorbent granules 42 and/or 44 of corresponding blend components 50 and/or 52 are at least partially formed or composed preferably is a smectite material, such as preferably a bentonite, as also discussed in more detail below.

In another preferred multicomponent blend 40 and preferred method of making such a multicomponent blend 40, absorbent granules 42 and 44 of respective blend components 50 and 52 are at least partially formed or composed of or from a dust containing, dust carrying, dust creating or dust forming liquid-absorbent material that preferably is both water and oil absorbent and which can be an inorganic dust containing, dust carrying, dust creating or dust forming liquid-absorbent material that preferably is both water and oil absorbent, and absorbent granules 46 of dust-suppressing blend component 78 that preferably is formed or composed of a liquid-absorbent organic material that preferably is both water and oil absorbent and formed or composed of or from an extrudate. In one such method and preferred multicomponent blend 40, dust-adhering absorbent granules 46 of dust-suppressing blend component 78 is made or composed of or from a starch-containing extrudate, preferably of or from extruded starch-containing pellets 84, as discussed in more detail below, and the dust containing, dust carrying, dust creating or dust forming liquid-absorbent material from or of which absorbent granules 42 and/or 44 of corresponding blend components 50 and/or 52 are at least partially formed or composed preferably is a smectite material, such as preferably a bentonite, as also discussed in more detail below.

Figure 3:
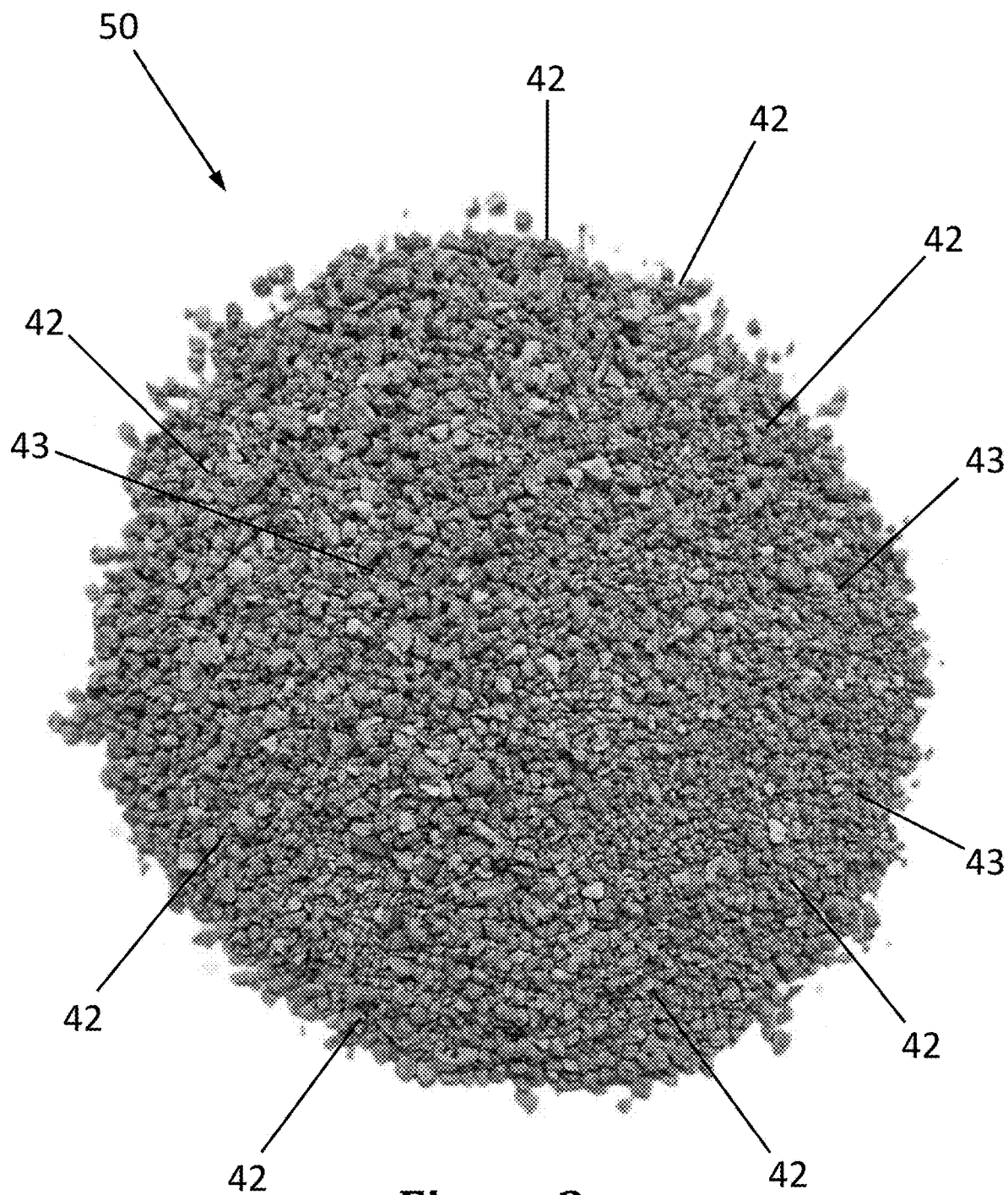
FIG. 3 is a color photograph of a first preferred component of the multicomponent blend of FIG. 1 composed of smectite granules each preferably formed of bentonite.
Figure 4:
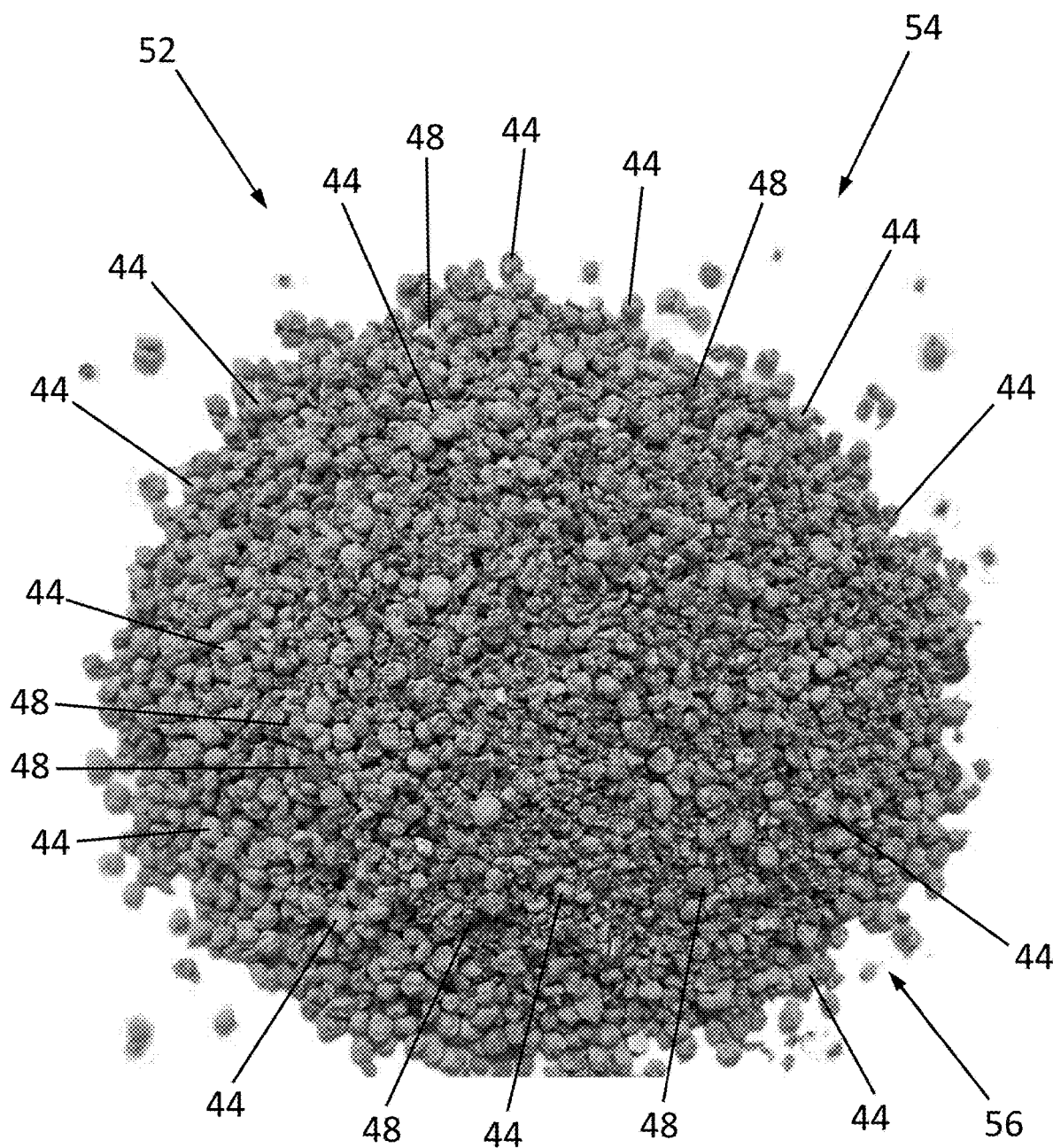
FIG. 4 is a color photograph of a second preferred component of the multicomponent blend of FIG. 1 composed of granules each preferably formed of extruded pellets coated in an outer smectite layer preferably formed of bentonite.
Figure 5:
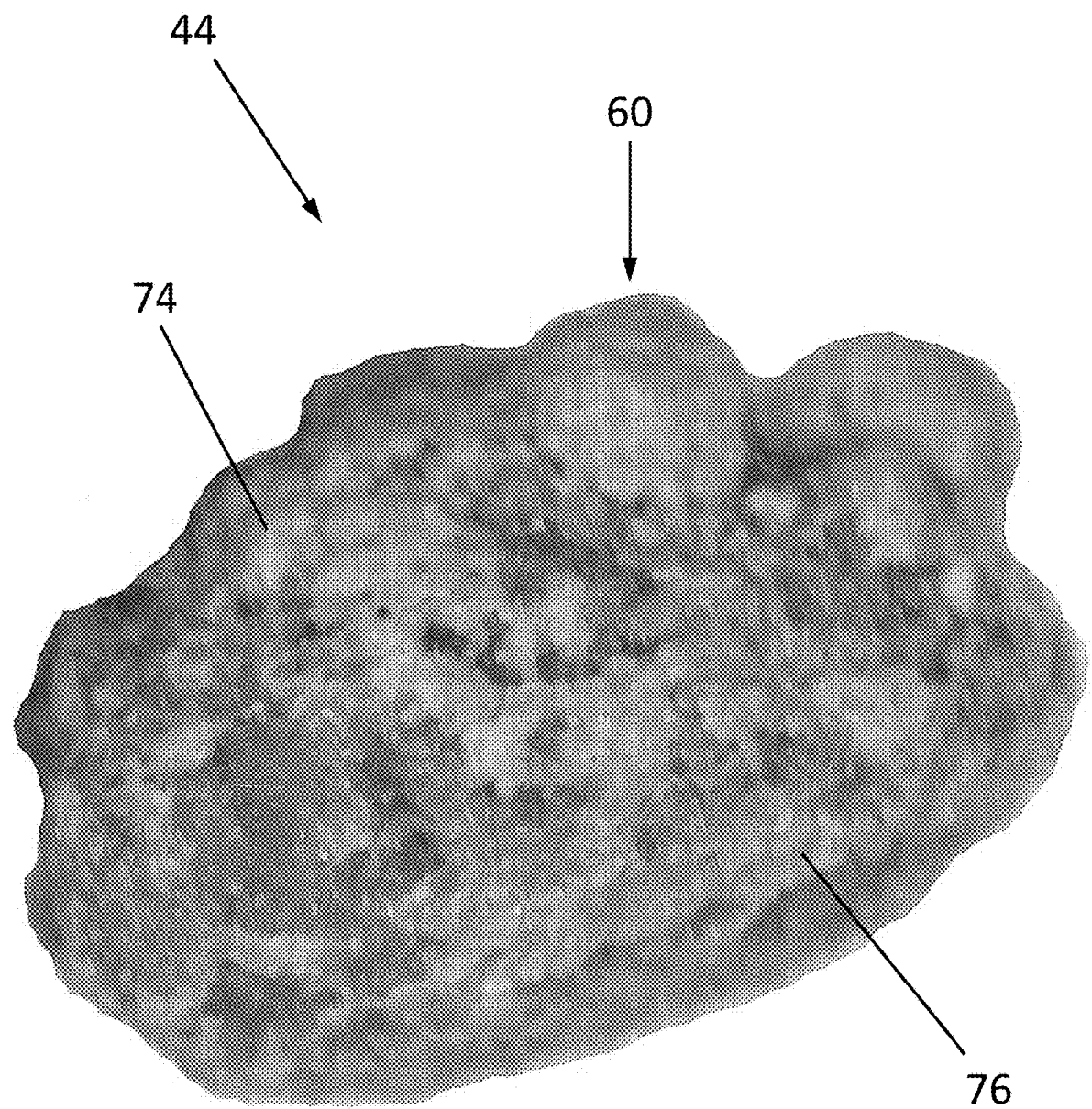
FIG. 5 is an enlarged color photograph of a bentonite coated absorbent granule of the component shown in FIG. 4.
Figure 6:
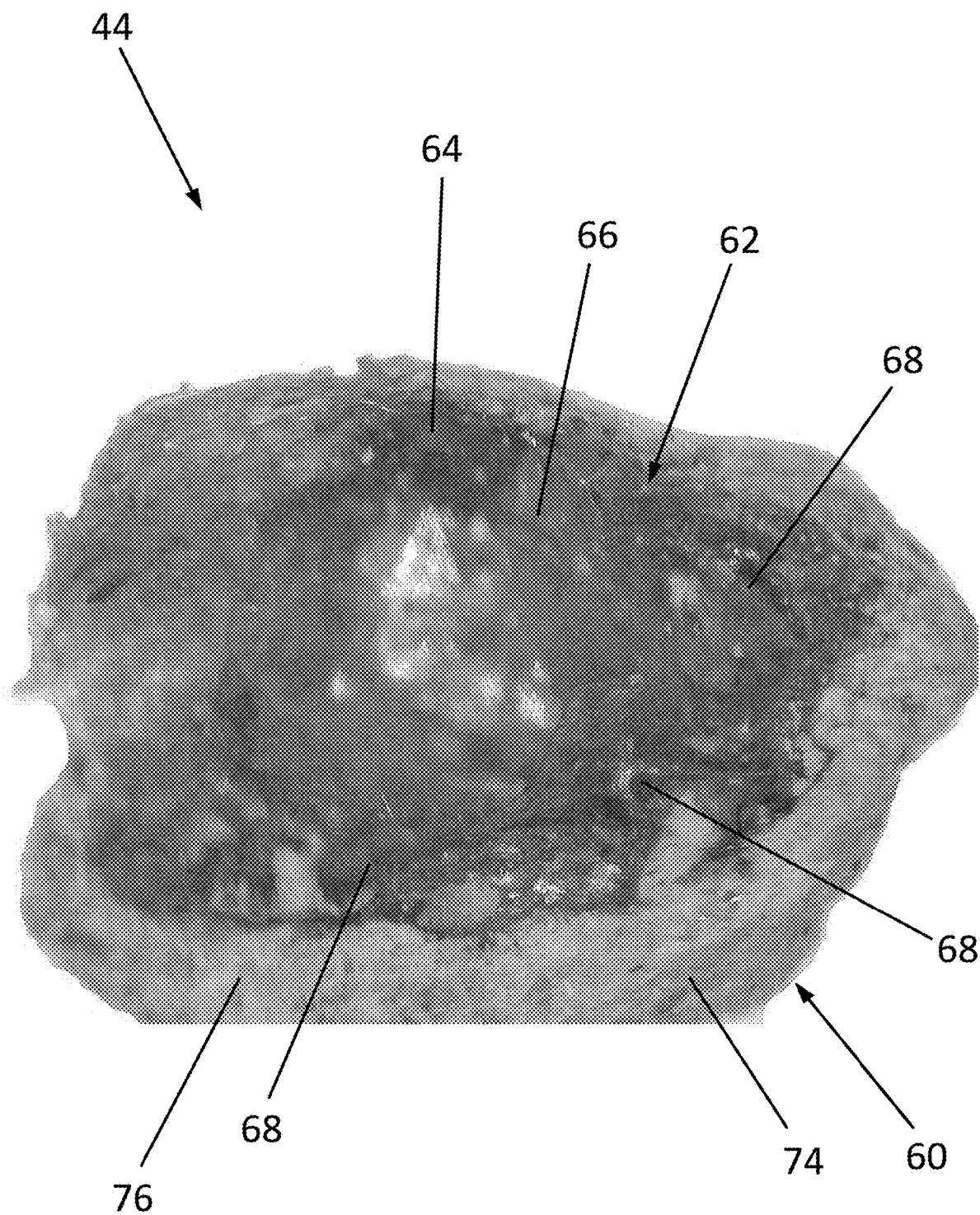
FIG. 6 is an enlarged color photograph of another bentonite coated absorbent granule of the component shown in FIG. 4 with a portion of the bentonite outer coating removed to show an underlying extruded absorbent pellet.
Figure 7:
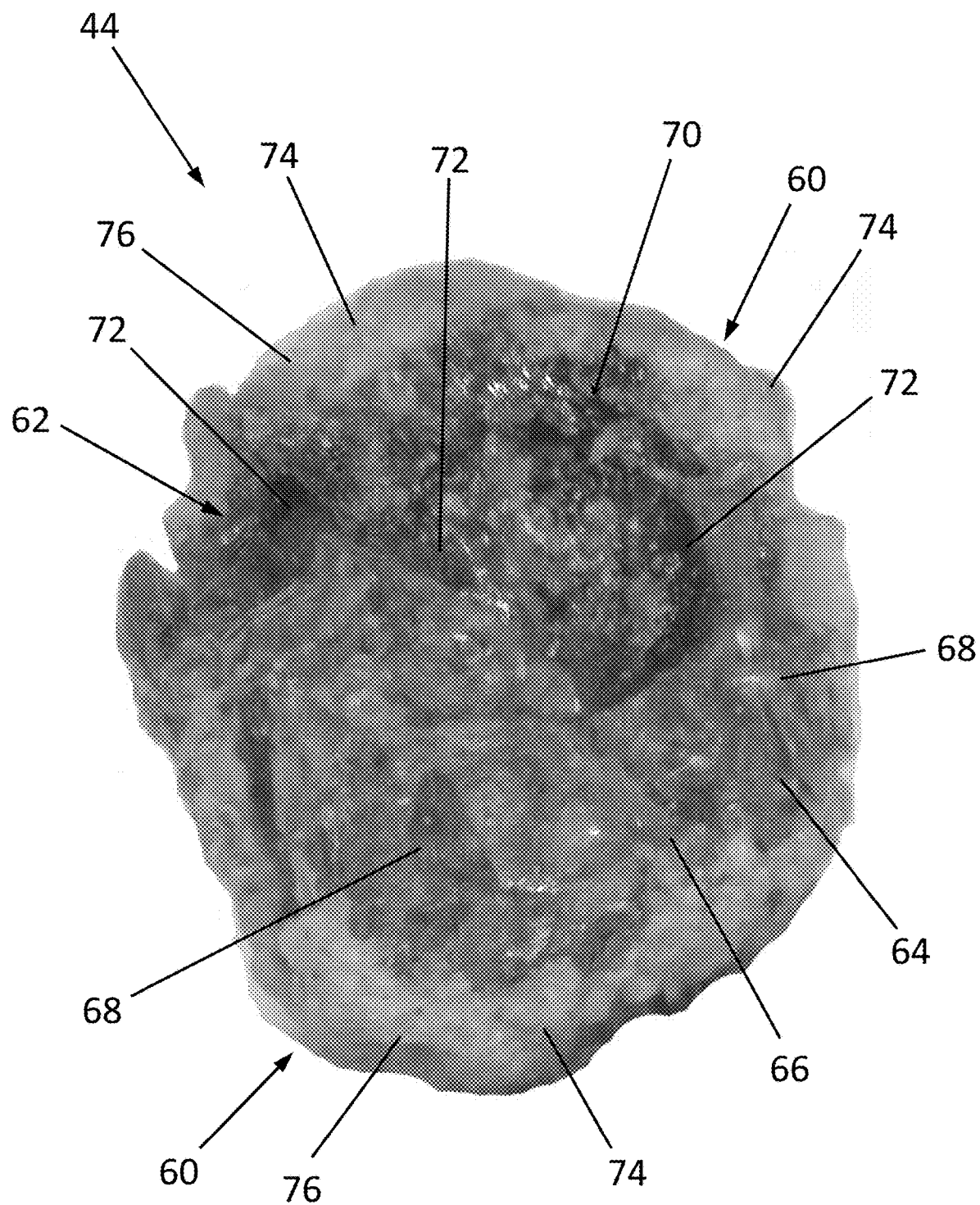
FIG. 7 is an enlarged color photograph of a cross-section of another bentonite coated absorbent granule of the component shown in FIG. 4 illustrating air-filled pockets within the extruded pellet coated with bentonite.

In a preferred method and multicomponent blend 40, blend 40 is made by mixing or blending at least one dust-suppressing component 68 together with at least one dust containing, dust carrying, dust creating or dust forming blend component such as preferably at least one of (a) a blend component 50, such as depicted in FIG. 3, which is composed of at least a plurality of pairs of absorbent granules 42, such as the granules 42 also depicted in FIG. 3, which are each substantially completely made or otherwise formed of a liquid absorbent material, e.g., water-absorbent material, like a smectite, such as a bentonite, and/or (b) a blend component 52, such as depicted in FIG. 4, which is composed of at least a plurality of pairs of absorbent granules 44, such as the granules 44 shown in FIGS. 5-7, each of which is at least partially made or formed (i) of a first type of liquid absorbent material, e.g., water-absorbent material, like smectite, such as bentonite, and (ii) of a second type of liquid absorbent material, e.g., water-absorbent material, which possesses a bulk density less than the first type of liquid absorbent material with the second type of liquid absorbent material preferably being an organic liquid absorbent material, e.g., an organic liquid absorbent material, composed or otherwise formed of or from an extrudate, which preferably is a starch-containing extrudate. As discussed in more detail below, dust-suppressing blend component 78 is composed of at least a plurality of pairs of dust-adhering absorbent granules 46 each made substantially completely of a starch-containing organic material preferably composed or otherwise formed of or from a starch-containing extrudate. In a preferred embodiment of a dust-suppressing blend component, blend component 78 is composed of at least a plurality of pairs of dust-adhering absorbent granules 46 each substantially completely composed of or from organic starch-containing extrudate containing none of the dust containing, dust carrying, dust creating or dust forming blend material used in any of the absorbent granules 42 and 44 of dust containing, dust carrying, dust creating or dust forming blend components 50 and 52.

The particular multicomponent granular absorbent blend 40 shown in FIGS. 1 and 2 is formed of a plurality of pairs of, i.e., at least three, different types of absorbent granules 42, 44, 46, with such a three or more component multicomponent blend 40 having (a) a smectite blend component 50 composed of at least a plurality of pairs of absorbent smectite granules 42, (b) a smectite-containing blend component 52 composed of at least a plurality of pairs of absorbent granules 44 each formed of a lightweight inner core 62 coated with an outer layer of absorbent and/or adsorbent material, and (c) a dust-suppressing blend component 78 containing at least a plurality of pairs of absorbent granules 46 each formed of an extrudate used in the blend without any outer smectite, e.g., bentonite, layer or coating present. Such a multi-part or multicomponent granular absorbent blend 40 of the present invention that is formed of at least three parts, at least three components and/or at least three blend components 50, 52, 78 therefore has at least three different types of absorbent granules 42, 44, 46 also contains dust, usually less than 2% by total granular absorbent blend weight and typically no more than 1% by total granular absorbent blend weight, with such dust being in the form of relatively small smectite particles 43, e.g., bentonite particles 43, which are each typically no larger in size than one hundred microns. However, the mixing of at least one dust-suppressing blend component 78 with at least one of at least a plurality of dust containing, dust carrying, dust creating or dust forming blend components 50 and/or 52 in carrying out a method of making an at least three part or three component multicomponent blend 40 of the present invention in or during at least one blending step of such a method of making a multicomponent blend 40 of the present invention, not only reduces the amount and number of dust particles 43 that become airborne during mixing of the multicomponent blend 40, but produces a low-dust multicomponent blend 40 having a plurality of different types of absorbent granules 42, 44, 46 with the presence of dust-adhering granules 46 causing at least some of these dust particles 43 to remain attached or otherwise adhered onto granules 46 during packing, transport, storage, pouring and/or scooping of multicomponent blend 40 advantageously reducing the amount of dust particles 43 which can and do become airborne during packing, transport, storage, pouring and/or scooping of blend 40. In carrying out such a method of making an at least three part or three component multicomponent blend 40 of the present invention, at least one of the dust containing, dust carrying, dust creating or dust forming blend components 50 or 52 is mixed with dust-suppressing blend component 78 (or vice versa) forming a two-part or two component intermediate blend before a second dust containing, dust carrying, dust creating or dust forming blend components 52 or 50 is mixed or otherwise blended with the intermediate blend because dust-suppressing blend component 78 advantageously inhibits dust particles 43 in both the intermediate blend and the resultant final multicomponent blend 40 from becoming airborne during carrying out such a method of making an at least three part or three component blend multicomponent blend 40 of the present invention.

In addition, the present invention also contemplates a multicomponent granular absorbent blend 40 and method of making a multicomponent granular absorbent blend 40 in accordance with the present invention where the multicomponent blend 40 is formed of formed of (a) a plurality of different types of blend components 78 and 50 or 52 but less than three different types of blend components, or (b) a plurality of different types of absorbent granules 46 and 42 or 44, but less than three different absorbent granule types, with such a multicomponent blend 40 having at least (a) a dust-suppressing blend component 78 containing at least a plurality of pairs of absorbent granules 46 each formed of an extrudate used in the blend without any outer smectite, e.g., bentonite, layer or coating present, and only one of either (b) a smectite, e.g., bentonite, blend component 50 composed of at least a plurality of pairs of absorbent smectite, e.g., bentonite, granules 42, or (b) a smectite-containing, e.g., bentonite-containing, blend component 52 composed of at least a plurality of pairs of absorbent granules 44 each formed of a lightweight inner core 62 coated with an outer layer of absorbent and/or adsorbent material. Such a two-part, two-component, or two absorbent granule type multicomponent blend 40 of the present invention that is formed of two parts or two blend components 78 and 50 or 52, therefore is formed of two different types of absorbent granules 46 and 42 or 44 also contains dust, usually less than 2% by total granular absorbent blend weight and typically no more than 1% by total granular absorbent blend weight, with such dust also being in the form of relatively small smectite particles 43, e.g., bentonite particles 43, which also are each typically no larger in size than one hundred microns. However, the mixing of at least one dust-suppressing blend component 78 with at least one dust containing, dust carrying, dust creating or dust forming blend component 50 or 52 (or vice versa) in carrying out a method of making of such a two part or two component multicomponent blend 40 of the present invention in or during at least one blending step of a method of making a multicomponent blend 40 of the present invention, not only reduces the amount and number of dust particles 43 that become airborne during mixing of the multicomponent blend 40, but produces a low-dust multicomponent blend 40 having a plurality of different types of absorbent granules 42, 44, 46 with the presence of dust-adhering granules 46 causing at least some of these dust particles 43 to remain attached or otherwise adhered onto granules 46 during packing, transport, storage, pouring and/or scooping of multicomponent blend 40 advantageously reducing the amount of dust particles 43 which can and do become airborne during packing, transport, storage, pouring and/or scooping of blend 40.

A multicomponent granular absorbent blend 40 of the present invention that is formed (a) of at least two parts or components 78 and 50 and/or 52, or (b) of at least two different types of absorbent granules 46 and 42 and/or 44 is advantageously well suited for many different types of absorbent or sorbent applications, including as a hydrocarbon absorbent (or hydrocarbon sorbent), as an oil absorbent (or oil sorbent), as a fuel absorbent (or fuel sorbent), as a gasoline absorbent (or gasoline sorbent), as a diesel fuel absorbent (or diesel fuel sorbent), as a kerosene absorbent (or kerosene sorbent), as a solvent absorbent (or solvent sorbent), as a chemical waste absorbent (or chemical waste sorbent), as an oil spill absorbent (or oil spill sorbent), as a chemical spill absorbent (or chemical spill sorbent), as a human waste absorbent (or human waste sorbent), and/or as a general purpose liquid absorbent (or general purpose liquid sorbent), and, as previously discussed, is particularly well suited for use as an absorbent low-dust litter (or sorbent litter), e.g. pet litter, animal litter, or cat litter, used to pick up water, urine and/or liquid fecal matter during use.

As also shown in FIG. 1, such a multicomponent granular absorbent blend 40 of the present invention can also contain another blend component that is a non-absorbent blend component in a relatively small amount, preferably less than 5% and more preferably no more than 2% by total weight of multicomponent blend 40 of non-absorbent particles 48, which can be colored, e.g. aesthetic in nature, and/or which can also be scented to provide scent to blend 40, such as for odor control. Where a blend 40 contains such non-absorbent particles 48, the particles 48 can also be, include and/or otherwise be formulated to provide odor control by providing, dispensing, containing or otherwise be composed of an antibacterial, antifungal, anti-yeast and/or antiviral agent and/or additive.

FIG. 3 shows a granular absorbent blend component 50 having a higher bulk density than dust-suppressing blend component 78 and which can be used in making a multicomponent granular absorbent blend 40 of the present invention with higher density blend component 50 having absorbent smectite granules 42 each substantially completely formed of clay, such as a swelling or absorbent clay, with each absorbent granule 42 of the higher density component 50 more preferably being substantially completely formed of bentonite, such as sodium bentonite, calcium bentonite and/or potassium bentonite. Such a smectite granular absorbent blend component 50, e.g. bentonite granular absorbent blend component 50, of the present invention also contains dust, usually no more than 1% by total blend component weight, typically in the form of relatively small smectite particles 43, e.g., bentonite dust particles 43, each typically smaller than 100 microns in size.

The smectite, preferably bentonite, absorbent granules 42 of higher density blend component 50 used in a multicomponent blend, e.g., blend 40, of the present invention has a bulk density of at least fifty pounds per cubic foot or of at least 0.80 grams per cubic centimeter and, where made up of relatively small size bentonite granules and/or bentonite dust, typically has a bulk density of at least fifty-five pounds per cubic foot or of at least 0.88 grams per cubic centimeter. In a preferred embodiment of a multicomponent blend 40 of the present invention made with such a higher density blend component 50, blend component 50 is formed substantially completely of bentonite granules 42 with blend component 50 having a bulk density of at least fifty pounds per cubic foot or of at least 0.80 grams per cubic centimeter and can have a bulk density of fifty-five pounds per cubic foot or of at least 0.88 grams per cubic centimeter or even greater in some instances.

While granule size and shape can vary, higher density blend component 50 preferably has at least 30% of its granules 42 of a size or sieve size of between US #10 mesh and US #18 mesh and more preferably has at least 50% of its granules 42 between US #10 mesh and US #18 mesh. Such a preferred higher density blend component 50 can and preferably also does have at least 10% of its granules 42 between US #18 mesh and US #40 mesh and more preferably have at least 15% of its granules 42 between US #18 mesh and US #40 mesh.

One preferred higher density blend component 50 used in at least one preferred multi-component granular absorbent blend, e.g., blend 40, in accordance with the present invention has at least 50% of its bentonite granules 42 between US #10 mesh and US #18 mesh, has at least 15% of its bentonite granules 42 between US #18 mesh and US #40 mesh, with component 50 having a bulk density of at least fifty pounds per cubic foot or at least 0.80 grams per cubic centimeter. Another preferred higher density blend component 50 has at least 60% of its bentonite granules 42 between US #10 mesh and US #18 mesh, has at least 18% of its bentonite granules 42 between US #18 mesh and US #40 mesh, with component 50 having a bulk density of at least fifty pounds per cubic foot or at least 0.88 grams per cubic centimeter. A still preferred higher density blend component 50 has at least 65% of its bentonite granules 42 between US #10 mesh and US #18 mesh, has at least 20% of its bentonite granules 42 between US #18 mesh and US #40 mesh, with component 50 having a bulk density of at least fifty-five pounds per cubic foot or at least 0.88 grams per cubic centimeter. Yet another preferred higher density blend component 50 has about 7%±2% of its bentonite granules 42 between US #7 mesh and US #10 mesh, has about 70%±10% of its bentonite granules 42 between US #10 mesh and US #18 mesh, has about 22.1%±10% of its bentonite granules 42 between US #18 mesh and US #40 mesh, has less than about 2% of its bentonite granules 42 smaller in size than US #40 mesh with component 50 having a bulk density of at least fifty-five pounds per cubic foot or at least 0.88 grams per cubic centimeter and typically having a bulk density of about sixty pounds per cubic foot or about 0.96 grams per cubic centimeter.

FIG. 4 shows a second or another granular absorbent blend component 52 used in making multicomponent absorbent granular blend 40 of the present invention that is a lower bulk density absorbent blend component 54 that can be and preferably is a middle bulk density absorbent blend component 56 when used in a granular absorbent blend of the present invention having three or more components, such as multi-component blend 40, as it has a bulk density less than that of higher bulk density component 50. Absorbent blend component 52 is formed of absorbent granules 44 formed of inner lightweight cores 62 at least partially covered in an outer absorbent coating 60 forming absorbent coated absorbent granules 44 that are lighter in weight and lower in bulk density than granules 42 of higher bulk density absorbent blend component 52. Because absorbent blend component 52 is lower in bulk density than higher bulk density absorbent blend component 50, the use of absorbent blend component 52 enables a multicomponent absorbent granular blend of the present invention, such as absorbent granular blend 40, to be produced that is a mixture or blend of at least component 50 and component 52 that is lower in bulk density and therefore lighter in weight than granular absorbent formed substantially completely or only of higher bulk density absorbent blend component 50.

While absorbent blend component 52 is shown in FIG. 4 as being composed of a mixture of absorbent granules 44 and particles 48, e.g., colored particles 48, like those discussed above, blend component 52 can be composed substantially completely of absorbent granules 44. As such, it is contemplated that an absorbent blend component 52 in accordance with the present invention can be composed only of absorbent granules 44 or substantially completely of absorbent granules 44 with such an absorbent blend component 52 lacking any particles 48 whatsoever if desired.

With additional reference to FIGS. 5-7, absorbent blend component 52 preferably is a lower density component 54 formed of lighter weight lower density absorbent granules 44 having a maximum bulk density of no greater than 45 lbs/ft$^3$, preferably no greater than 40 lbs/ft$^3$, and more preferably no greater than 35 lbs/ft$^3$. In such an absorbent blend component 52, the absorbent granules 44 have a minimum bulk density of at least 15 lbs/ft$^3$, preferably of at least 18 lbs/ft$^3$, and more preferably of at least about 20 lbs/ft$^3$±5 lbs/ft$^3$.

In one preferred absorbent blend component 52, component 52 is formed of absorbent granules 44 having a bulk density of between 20 lbs/ft$^3$ and 45 lbs/ft$^3$, preferably between 25 lbs/ft$^3$ and 40 lbs/ft$^3$, and more preferably between 27 lbs/ft$^3$ and 32 lbs/ft$^3$. One such preferred absorbent blend component 52 itself has a bulk density of between 20 lbs/ft$^3$ and 45 lbs/ft$^3$, preferably between 25 lbs/ft$^3$ and 40 lbs/ft$^3$, and more preferably between 27 lbs/ft$^3$ and 32 lbs/ft$^3$.

While granule size and shape can vary, absorbent coated absorbent granules 44 of absorbent-coated absorbent granule granular blend component 52 of the present invention preferably have at least 10% of its granules 44 of a size or sieve size of between US #7 mesh and US #10 mesh and more preferably has at least 20% of its granules 42 between US #7 mesh and US #10 mesh. Such a preferred blend component 52 can and preferably also does have at least 25% of its granules 44 with a size of between US #10 mesh and US #18 mesh and more preferably have at least 40% of its granules 42 between US #10 mesh and US #18 mesh. Such a preferred blend component 52 can and preferably also does have at least 10% of its granules 44 with a size of between US #18 mesh and US #40 mesh and more preferably have at least 15% of its granules 42 between US #18 mesh and US #40 mesh.

One preferred absorbent-coated absorbent granule granular blend component 52 used in a preferred multi-component granular absorbent blend, e.g., multicomponent blend 40, constructed or otherwise formulated accordance with the present invention has at least 15% of its granules 44 between US #7 mesh and US #10 mesh, has at least 30% of its granules 44 between US #10 mesh and US #18 mesh, has at least 15% of its granules 44 between US #18 mesh and US #40 mesh. Another preferred absorbent coated absorbent granule granular blend component 52 used in a preferred multi-component granular absorbent blend, e.g., multicomponent blend 40, in accordance with the present invention has at least 20% of its granules 44 between US #7 mesh and US #10 mesh, has at least 40% of its granules 44 between US #10 mesh and US #18 mesh, has at least 17.5% of its granules 44 between US #18 mesh and US #40 mesh. Still another preferred absorbent coated absorbent granule granular blend component 52 used in a preferred multi-component granular absorbent blend, e.g., multicomponent blend 40, in accordance with the present invention has at least 22.5% of its granules 44 between US #7 mesh and US #10 mesh, has at least 42.5% of its granules 44 between US #10 mesh and US #18 mesh, has at least 18% of its granules 44 between US #18 mesh and US #40 mesh.

Each absorbent granule 44 of blend component 52 is liquid absorbent as each granule 44 absorbs at least two times absorbent granule weight in water, preferably at least 2.5 times absorbent granule weight in water in water, and more preferably at least three times absorbent granule weight in water. Each absorbent granule 44 preferably absorbs at least two times its own weight of water, preferably absorbs at least 2.5 times its own weight of water, and more preferably absorbs at least three times its own weight in water when tested for water absorbency pursuant to ASTM F716. Each absorbent granule 44 preferably also absorbs at least two times its own weight of water, preferably absorbs at least 2.5 times its own weight of water, and more preferably absorbs at least three times its own weight in water when tested for water absorbency pursuant to ASTM F726.

Not only do the absorbent granules 44 of blend component 52 possess good water absorption, each absorbent granule 44 of blend component 52 also is oil absorptive such that each absorbent granule 44 of blend component 52 also functions as an oil absorbent or oil sorbent when used in a multicomponent granular absorbent blend, such as blend 40, as each absorbent granule 44 is capable of absorbing at least one times its own weight in oil and preferably is capable of absorbing at least two times its own weight in oil. Each absorbent granule 44 of blend component 52 used in a multicomponent blend of the present invention preferably therefore also is an oil absorbent granule 44 that absorbs at least 1.5 times the weight of absorbent granule 44 in oil, preferably at least two times the weight of absorbent granule 44 in oil, and more preferably at least three times the weight of absorbent granule 44 in oil when tested for oil absorbency using ASTM F716. In one preferred blend component 52, each absorbent granule 44 is an oil absorbent granule 44 that absorbs at least 1.5 times its own granule weight in oil, preferably at least two times its own granule weight in oil, and more preferably at least three times its own granule weight in oil when tested for oil absorbency pursuant to ASTM F726.

Turning now to FIGS. 5-7, each absorbent granule 44 of lower density absorbent blend component 52 has an outer layer 60 at least partially and preferably substantially completely covering an inner lightweight core 62 (FIGS. 6 and 7) that preferably is void filled and which also can be of porous construction to help facilitate absorption of liquid, e.g., water, urine, oils, solvents, and the like, thereby even when covered by outer layer 60. As best shown in FIG. 6, each preferred lightweight core 62 is formed of a generally round, cylindrical, oblong and/or elongate absorbent mass 64 made of an organic material that preferably also is biodegradable which has an outer surface 66 with at least a plurality, preferably at least a plurality of pairs, i.e., at least three, of pores 68 formed the outer surface 66 that facilitate liquid absorption even when coated with outer layer 60. As best shown in FIG. 7, each lightweight core 62 preferably also has an absorbent interior 70 with at least a plurality and preferably at least a plurality of pairs, i.e., at least three, spaced apart voids or pockets 72 formed or otherwise disposed in the interior 70 that also or further facilitate liquid absorption.

If desired, the interior 70 of the absorbent mass 64 that defines the core 62 of at least a plurality, preferably at least a plurality of pairs, i.e., at least three, of absorbent granules 44 of absorbent blend component 52 of multicomponent granular absorbent blend of the present invention can and preferably does also include cellulosic material that can be and preferably is a fibrous and/or wicking cellulosic material to help facilitate liquid absorption during granular absorbent blend use via capillary action and/or wicking of liquid being absorbed. Where cellulosic material is included in one or more lightweight cores 62 of one or more absorbent granules 44 of such an absorbent blend component 52, the use of fibrous and/or wicking cellulosic material facilitates liquid absorption by causing liquid to be more rapidly absorbed by and into such cellulose-containing absorbent granules.

Where an absorbent granule 44 has a lightweight core 62 formed of such a cellulose-material containing absorbent mass 64, core 62 preferably contains at least 5% cellulose or cellulosic material by weight of core 62 and preferably contains no more than 50% cellulose or cellulosic material by core weight. In a preferred absorbent granule embodiment, where absorbent blend component 52 contains absorbent granules 44 with lightweight cores 62 formed of such a cellulose-material containing absorbent mass 64, the core 62 or mass 64 of each granule 44 preferably contains between 5% and 45% by weight of core 62. In a preferred absorbent granule embodiment, where absorbent blend component 52 contains absorbent granules 44 with lightweight cores 62 formed of such a cellulose-material containing absorbent mass 64, the core 62 or mass 64 of each granule 44 preferably contains between 10% and 35% by weight of core 62.

To substantially reduce the bulk density and hence the weight of the absorbent granules 44 used in blend component 52, forming each lightweight core 62 of each granule 44 of an organic material that preferably is both absorbent and biodegradable also advantageously produces a relatively lightweight cores 62 has a relatively low bulk density of at least about 7 lbs/ft$^3$±2.5 lbs/ft$^3$ and preferably no greater than about 25 lbs/ft$^3$±5 lbs/ft$^3$. A preferred blend component 52 is composed of absorbent granules 44 each formed of a lightweight core 62 with each core 62 having a relatively low bulk density of no greater than 12 lbs/ft$^3$ and preferably no greater than 10 lbs/ft$^3$. Another preferred blend component 52 is composed of absorbent granules 44 each formed of a lightweight core 62 with each core 62 having a relatively low bulk density of no greater than 8 lbs/ft$^3$ and preferably no greater than 6 lbs/ft$^3$.

In one preferred blend component 52, each one of its absorbent granules 44 is formed of a lightweight core 62 having a bulk density of at least 4 lbs/ft$^3$ and no greater than 20 lbs/ft$^3$. In another preferred blend component 52, each one of its absorbent granules 44 is formed of a lightweight core 62 having a bulk density of at least 5 lbs/ft$^3$ and no greater than 15 lbs/ft$^3$.

Such low density cores 62 used in each absorbent granule 44 not only substantially reduces the bulk density and hence the weight of the absorbent granules 44 used in absorbent blend component 52, they do so without detracting from absorbent performance of the multicomponent blend in which component 52 is used. This is because each lightweight core 62 is itself liquid absorbent by being capable of absorbing at least two times the weight of the lightweight core 62 in liquid, preferably at least three times the weight of the lightweight core 62 in liquid, and more preferably at least 3.5 times the weight of the lightweight core 62 in liquid.

Each lightweight core 62 of each absorbent granule 44 of blend component 52 is a liquid absorbent core 62, e.g. water absorbent core 62, which preferably absorbs at least two times the weight of the lightweight core 62 in water, preferably at least three times the weight of the lightweight core 62 in water, and more preferably at least 3.5 times the weight of the lightweight core 62 in water when tested for water absorbency pursuant to ASTM F716f. In one preferred blend component 52, each lightweight core 62 of each absorbent granule 44 is a liquid absorbent core 62 that absorbs at least two times the weight of the lightweight core 62 in water, preferably at least three times the weight of the lightweight core 62 in water, and more preferably at least 3.5 times the weight of the lightweight core 62 in water when tested for water absorbency pursuant to ASTM F726.

Not only does each lightweight core 62 of each absorbent granule 44 of blend component 52 possess good water absorption characteristics, each lightweight core 62 of each absorbent granule 44 of blend component 52 also is oil absorptive such that each lightweight core 62 of each absorbent granule 44 of blend component 52 functions as an oil absorbent or oil sorbent capable of absorbing at least one times its weight in oil and preferably is capable of absorbing at least two times its weight in oil. Each lightweight core 62 of each absorbent granule 44 of blend component 52 preferably therefore also is an oil absorbent core 62 that absorbs at least 1.5 times the weight of the lightweight core 62 in oil, preferably at least two times the weight of the lightweight core 62 in oil, and more preferably at least three times the weight of the lightweight core 62 in oil when tested for oil absorbency using ASTM F716f. In one preferred blend component 52, each lightweight core 62 of each absorbent granule 44 is an oil absorbent core 62 that absorbs at least 1.5 times the weight of the lightweight core 62 in oil, preferably at least two times the weight of the lightweight core 62 in oil, and more preferably at least three times the weight of the lightweight core 62 in oil when tested for oil absorbency pursuant to ASTM F726.

In a preferred lightweight core embodiment and method of making lightweight absorbent cores 62, organic starch-containing material is extruded under sufficient temperature and pressure from a single screw or twin screw extruder in the form of absorbent masses 64 that each form or define a corresponding lightweight core 62 each of which is subsequently covered or coated with outer layer 60 to produce the absorbent granules 44 of granular absorbent blend component 52 used in making a multicomponent granular absorbent blend, e.g., blend 40, of the present invention. In one such preferred implementation, each core 62 is formed by extruding a starching containing organic material, preferably in the form of one or more cereal grains, at a temperature of at least 100 degrees Celsius and at a pressure of at least 800 pounds per square inch, preferably of at least 1000 pounds per square inch, and more preferably of at least 1500 pounds per square inch, sufficient to extruded absorbent masses 64 which not only define lightweight cores 62 but which also form liquid soluble, preferably water soluble binder, from or of at least some of the starch during extrusion sufficient to facilitate clumping of a plurality of absorbent granules 44 formed of the cores 62 together when wetted with liquid, preferably water, e.g. water containing at least some sodium, e.g., saline solution, producing a self-clumping granular absorbent blend component 52.

In a preferred implementation, each lightweight core 62 is formed by extruding void or pocket filled expanded liquid absorbent masses 64 from a single screw or twin screw extruder from a starch-containing admixture containing a sufficient amount of starch such that each extruded mass 64 has at least 7.5% water soluble binder by core or mass weight formed of or from starch in the admixture during extrusion. In such a preferred implementation, an admixture formed substantially of one or more cereal grains, preferably whole-grain corn, corn meal, e.g., de-germed corn meal, corn grits, or another form of corn or maize, is extruded from a single screw extruder at a temperature of at least 90 degrees Celsius, preferably at least 100 degrees Celsius, and at a pressure of at least 1000 pounds per square inch, preferably of at least 1500 pounds per square inch, and more preferably of at least 2000 pounds per square inch, to extrude liquid absorbent pellets that each define a lightweight absorbent core 62 or mass 64 that each have at least some water soluble binder forming at least a portion of the outer core or mass surface 66, e.g., outer extruded pellet surface, and containing at least 7.5% water soluble binder by extruded core or mass weight, e.g., by extruded pellet weight. Such core or mass forming pellets can be extruded from such a starch containing admixture preferably substantially completely formed of one or more such cereal grains with up to 40% and preferably no more than about 35% of the admixture being composed of cellulose or cellulosic material.

In another preferred implementation, each lightweight core 62 is formed by extruding void or pocket filled expanded liquid absorbent masses 64, e.g., pellets, from a single screw or twin screw extruder from a starch-containing admixture containing a sufficient amount of starch such that each extruded mass 64 has at least 9% water soluble binder by core or mass weight formed of or from starch in the admixture during extrusion. In such a preferred implementation, an admixture formed substantially of one or more cereal grains, preferably whole-grain corn, corn meal, e.g., de-germed corn meal, corn grits, or another form of corn or maize, is extruded from a single screw extruder at a temperature of at least 90 degrees Celsius, preferably at least 100 degrees Celsius, and at a pressure of at least 1000 pounds per square inch, preferably of at least 1500 pounds per square inch, and more preferably of at least 2000 pounds per inch, to extrude such liquid absorbent cores 62 or masses 64 having at least some water soluble binder forming at least a portion of the outer core or mass surface 66 and containing at least 9% water soluble binder by extruded core or mass weight. Such cores 62 or masses 64 can be extruded from such a starch containing admixture preferably substantially completely formed of one or more such cereal grains with up to 40% and preferably no more than about 35% of the admixture being composed of cellulose or cellulosic material.

With continued reference to FIGS. 5-7, each lightweight core 62 is coated or otherwise covered with an outer layer 60 formed of an absorbent and/or adsorbent material 74 after extrusion to produce an absorbent coated absorbent granule 44 of absorbent coated absorbent granule granular blend component 52 of the present invention each having an absorbent and/or adsorbent outer absorbent granule surface 76. In a preferred absorbent granule embodiment and method of making same, each extruded lightweight core 62 is covered, preferably substantially completely encapsulated, with an outer layer 60 of smectite, such as a swelling or absorbent clay, which preferably is or includes bentonite, such as sodium bentonite, calcium bentonite and/or potassium bentonite. If desired, the outer layer 60 of absorbent and/or adsorbent material 74 covering each lightweight core 62 can include and/or be composed of another type of absorbent and/or adsorbent material, such as an aluminosilicate material, such as zeolite, sodium aluminosilicate, calcium aluminosilicate and/or another aluminum-based, calcium-based and/or silicate based adsorbent.

Figure 8:
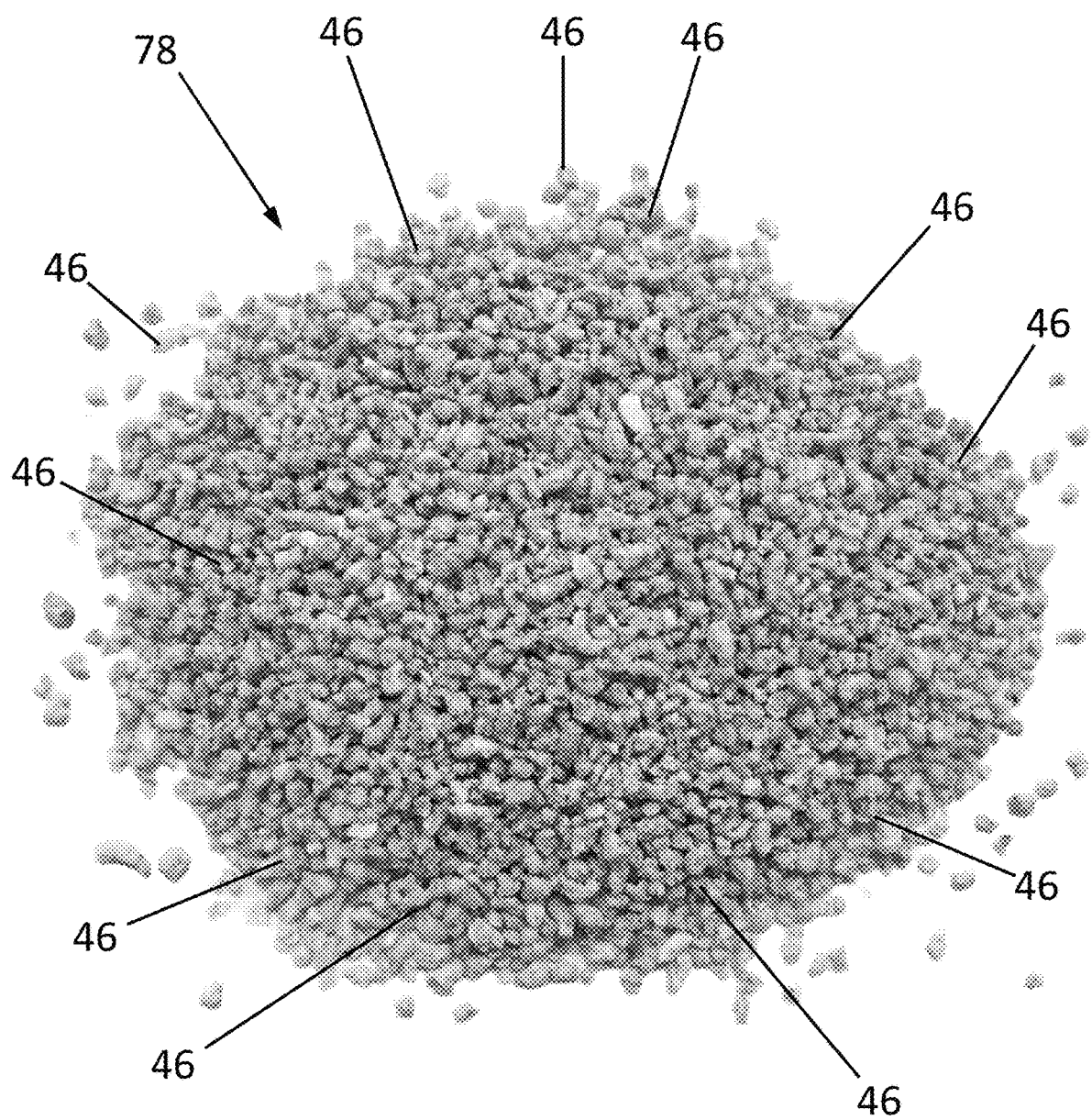
FIG. 8 is a color photograph of a third preferred component of the multicomponent blend of FIG. 1 composed of absorbent granules each formed of extruded pellets that also cause bentonite dust to adhere thereto when part of a multicomponent mix formed of a bentonite-containing component.

FIG. 8 illustrates a third or further absorbent granular absorbent blend component 78 formed of at least a plurality of pairs, i.e., at least three, lower density lighter weight absorbent granules 46 also used in making multicomponent absorbent granular blend 40 of the present invention that also is a lower bulk density absorbent blend component 78, e.g., lightweight bulk density blend component 78, which can be and preferably is even lower in bulk density than either or both component higher bulk density blend component 50 and middle bulk density blend component 52. With additional reference to FIG. 9, each one of the absorbent granules 46 of such a lightweight granular absorbent blend component 78 is formed of a liquid absorbent mass 80 that preferably is internally void filled and which also can be of porous construction to help facilitate absorption of liquid, e.g., water, urine, oils, solvents, and the like. In contrast to absorbent granules 44 of granular absorbent blend component 52, each one of the absorbent granules 46 of granular absorbent blend component 78 lacks any such absorbent or adsorbent outer layer or coating and preferably is used in blend component 78 in making a multicomponent absorbent granular blend, e.g. blend 40, of the present invention without any outer layer or coating. Preferably, each one of the absorbent granules 46 of granular absorbent blend component 78 is used uncoated in component 78 as well as in making a multicomponent absorbent granular blend, e.g. blend 40, of the present invention.

Figure 9:
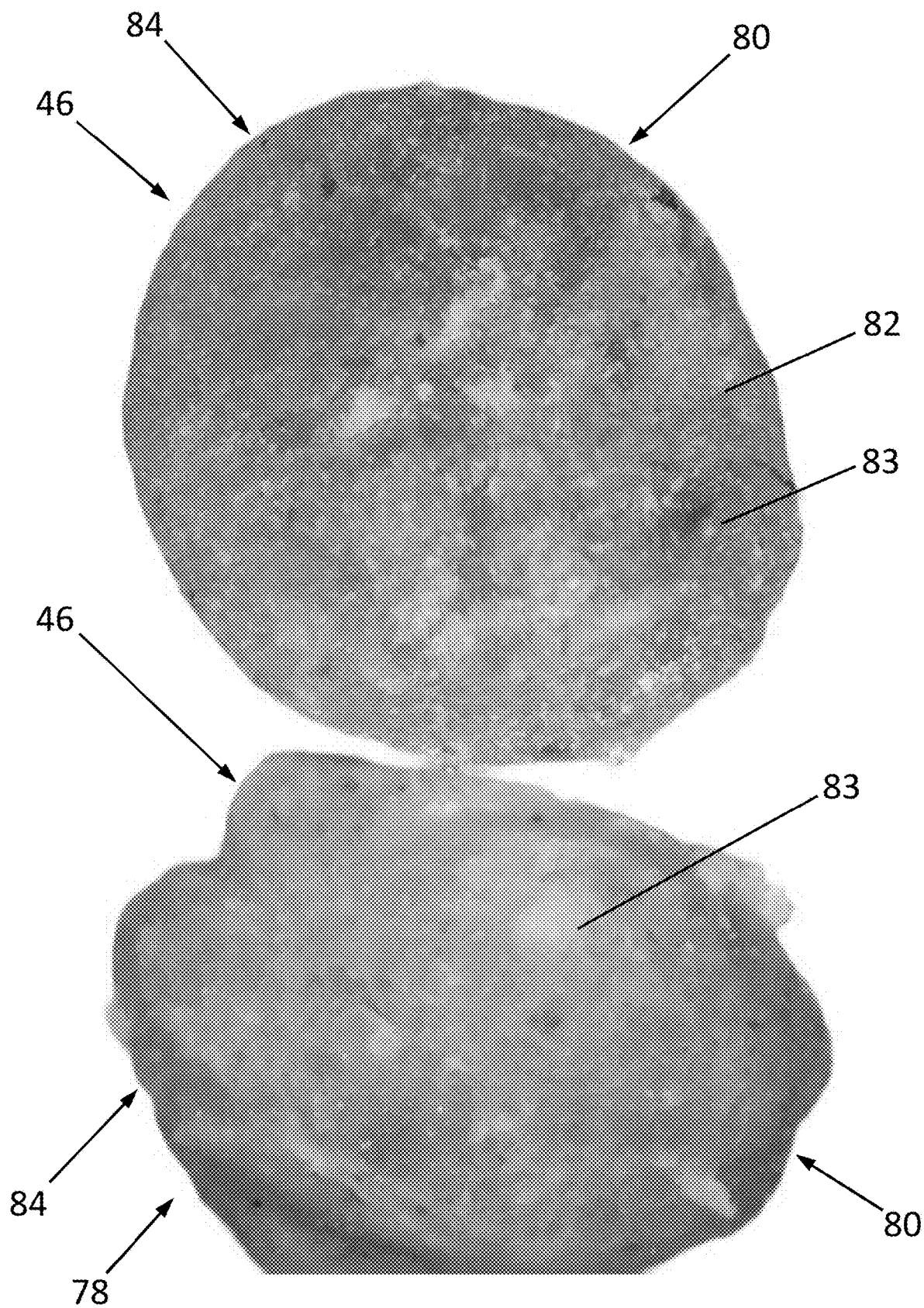
FIG. 9 is an enlarged microscope photograph of an uncoated extruded pellet forming an uncoated absorbent granule of the component of FIG. 8.

With continued reference to FIG. 9, each uncoated absorbent granule 46 is formed of a generally round, cylindrical, oblong and/or elongate absorbent mass 80 made of an organic material that preferably also is biodegradable which has an liquid absorbent outer surface 82 that preferably is at least partially formed or composed of a liquid soluble material 83, preferably water soluble material, surrounding a void or pocket filled liquid absorbent interior. Although not shown in FIG. 9, one or more and preferably each uncoated absorbent granule 46 of uncoated granular absorbent granular blend component 78 preferably has an outer surface 82 that is not only at least partially composed or formed of a water soluble material 83 to facilitate liquid absorption during granular absorbent use, outer surface 82 preferably has at least a plurality of spaced apart pores formed therein that further facilitate water absorption including by increasing the speed or rate of water absorption. Although also not shown in FIG. 9, one or more and preferably each uncoated absorbent granule 46 of uncoated granular absorbent granular blend component 78 preferably has an interior disposed inwardly of outer surface 82 that preferably has at least a plurality of spaced apart voids or air-filled pockets formed therein that further facilitate water during absorbent use.

If desired, each uncoated absorbent granule 46 of blend component 78 can and preferably does also include cellulosic material that can be and preferably is a fibrous and/or wicking cellulosic material to help facilitate liquid absorption during granular absorbent blend use via capillary action and/or wicking of liquid being absorbed. Where cellulosic material is included in one or more uncoated absorbent granules 46 of such an absorbent blend component 78, the use of fibrous and/or wicking cellulosic material facilitates liquid absorption by causing liquid to be more rapidly absorbed by and into such cellulose-containing absorbent granules.

Where an uncoated absorbent granule 46 includes cellulose-material, each cellulose containing granule preferably contains at least 5% cellulose or cellulosic material by weight of uncoated absorbent 46 and preferably contains no more than 50% cellulose or cellulosic material by uncoated absorbent granule weight. In a preferred uncoated absorbent granule embodiment, where uncoated absorbent granule blend component 78 contains uncoated absorbent granules 46 formed with such cellulose material, each uncoated absorbent granule 46 preferably contains between 5% and 45% by uncoated absorbent granule weight. In one such preferred uncoated absorbent granule embodiment, where absorbent blend component 78 contains uncoated absorbent granules 46 formed with such a cellulose-containing material, each granule 46 preferably contains between 10% and 35% by uncoated granular absorbent weight.

To substantially reduce the bulk density and hence the weight of the uncoated absorbent granules 46 used in blend component 78 as well as when used in a multicomponent granular absorbent blend of the present invention, forming each uncoated absorbent granule 46 of an organic material that preferably is both absorbent and biodegradable also advantageously produces relatively lightweight uncoated absorbent granules 46 having a relatively low bulk density of no greater than about 45 lbs/ft$^3$±5 lbs/ft$^3$. A preferred blend component 78 is composed of uncoated absorbent granules 46 each formed of a lightweight lower density liquid absorbent biodegradable organic material that results in each uncoated absorbent granule 46 having a relatively low bulk density of no greater than 35 lbs/ft$^3$ and preferably no greater than about 30 lbs/ft$^3$. Another preferred blend component 78 is composed of uncoated absorbent granules 46 each formed of lightweight lower density liquid absorbent biodegradable organic material producing uncoated absorbent granules 46 each having a bulk density no greater than about 25 lbs/ft$^3$±5 lbs/ft$^3$.

In another preferred embodiment of an uncoated granular absorbent blend component 78 of the present invention, blend component 78 has a bulk density of no greater than 45 lbs/ft$^3$ and which preferably has a bulk density of between 10 lbs/ft$^3$ and 45 lbs/ft$^3$, which more preferably is between 15 lbs/ft$^3$ and 35 lbs/ft$^3$, and which even more preferably is between 22 lbs/ft$^3$ and 33 lbs/ft$^3$. In another such preferred embodiment of such an uncoated granular absorbent blend component 78 of the present invention, the uncoated absorbent granules 46 of blend component 78 have a bulk density of no greater than 45 lbs/ft$^3$ that preferably is between 15 lbs/ft$^3$ and 40 lbs/ft$^3$, which more preferably is between 20 lbs/ft$^3$ and 35 lbs/ft$^3$, and which even more preferably is between 25 lbs/ft$^3$ and 33 lbs/ft$^3$.

Such uncoated absorbent granules 46 used in blend component 78 not only substantially reduces the bulk density and hence the weight of the blend component 78 and the multicomponent granular absorbent blend, e.g., blend 40, of the present invention, but the use of such relatively low density uncoated absorbent granules 46 does so without detracting from absorbent performance of the multicomponent blend in which component 52 is used. This is because each uncoated absorbent granule 46 is itself liquid absorbent by being capable of absorbing at least two times uncoated absorbent granule weight of liquid, preferably at least three times uncoated absorbent granule weight of liquid, and more preferably at least 3.5 times uncoated absorbent granule weight of liquid.

Each uncoated absorbent granule 46 of blend component 78 is water absorbent as each granule 46 preferably absorbs at least two times the weight of the uncoated absorbent granule 46 in water, preferably at least three times the weight of the uncoated absorbent granule 46 in water, and more preferably at least 3.5 times the weight of the uncoated absorbent granule 46 in water when tested for water absorbency pursuant to ASTM F716. In one preferred blend component 78, each uncoated absorbent granule 46 absorbs at least two times the weight of the granule 46 in water, preferably at least three times the weight of the granule 46 in water, and more preferably at least 3.5 times the weight of the granule 46 in water when tested for water absorbency pursuant to ASTM F726.

Not only does each uncoated absorbent granule 46 of blend component 78 possess good water absorption characteristics, each uncoated absorbent granule 46 of such a blend component 78 of the present invention also is oil absorptive such that each uncoated absorbent granule 46 of blend component 78 functions as an oil absorbent or oil sorbent capable of absorbing at least one times its weight in oil and preferably is capable of absorbing at least two times its weight in oil. Each uncoated absorbent granule 46 of blend component 78 preferably therefore also is an oil absorbent uncoated absorbent granule that absorbs at least 1.5 times the weight of uncoated absorbent granule 46 in oil, preferably at least two times the weight of uncoated absorbent granule 46 in oil, and more preferably at least three times the weight of uncoated absorbent granule 46 in oil when tested for oil absorbency using ASTM F716. In one preferred blend component 78, each uncoated absorbent granule 46 is an oil absorbent uncoated absorbent granule that absorbs at least 1.5 times its granule weight in oil, preferably absorbs at least two times its weight in oil, and more preferably absorbs at least three times its weight in oil when tested for oil absorbency in accordance with ASTM F726.

In a preferred lightweight core embodiment and method of making lightweight absorbent cores 62, organic starch-containing material is extruded under sufficient temperature and pressure from a single screw or twin screw extruder in the form of absorbent masses 64 that each form or define a corresponding lightweight core 62 each of which is subsequently covered or coated with outer layer 60 to produce the absorbent granules 44 of granular absorbent blend component 52 used in making a multicomponent granular absorbent blend, e.g., blend 40, of the present invention. In one such preferred implementation, each core 62 is formed by extruding a starching containing organic material, preferably in the form of one or more cereal grains, at a temperature of at least 100 degrees Celsius and at a pressure of at least 1000 pounds per square inch, preferably at least 1500 pounds per square inch, sufficient to extruded absorbent masses 64 which not only define lightweight cores 62 but which also form liquid soluble, preferably water soluble binder, from or of at least some of the starch during extrusion sufficient to facilitate clumping of a plurality of absorbent granules 44 formed of the cores 62 together when wetted with liquid, preferably water, e.g. water containing at least some sodium, e.g., saline solution, producing a self-clumping granular absorbent blend component 52.

In a preferred implementation, each uncoated absorbent granule 46 is formed by extruding void or pocket filled expanded liquid absorbent masses 80 using a single screw or twin screw extruder from a starch-containing admixture containing a sufficient amount of starch such that each extruded mass 80 has at least 8% water soluble binder by weight of the mass 80 or uncoated absorbent granule 46 formed of or from starch in the admixture during extrusion. In such a preferred implementation, an admixture formed substantially of one or more starch-containing cereal grains, preferably including or substantially completely from whole-grain sorghum, e.g., de-germed whole-grain sorghum, is extruded from a single screw extruder at a temperature of at least 100 degrees Celsius, preferably at least 120 degrees Celsius, and at a pressure of at least 1500 pounds per square inch, preferably at least 2000 pounds per square inch to extrude liquid absorbent pellets 84 preferably used uncoated to produce or otherwise form uncoated extruded absorbent granules 46 that form uncoated granular absorbent blend component 78 of the present invention each having at least some water soluble binder therein that forms at least a portion of the outer uncoated absorbent granule or pellet surface 82, e.g., outer extruded pellet surface, and each containing at least 9% water soluble binder by extruded pellet weight. Such extruded pellets 84 used to produce the uncoated absorbent granules 46 can be extruded from such a starch containing admixture preferably substantially completely formed of one or more such cereal grains with up to 40% and preferably no more than about 35% of the admixture being composed of cellulose or cellulosic material.

In one preferred implementation, each uncoated absorbent granule 46 is formed by extruding void or pocket filled expanded liquid absorbent masses 80 in the form of pellets 84 discharged from a single screw or twin screw extruder from a starch-containing admixture containing a sufficient amount of starch such that each extruded mass 80 or pellet 84 produces an uncoated absorbent granule 46 having at least 9% water soluble binder by weight thereof formed of or from starch in the admixture during extrusion. In such a preferred implementation, an admixture formed substantially of one or more cereal grains, preferably including or substantially completely from whole-grain sorghum, e.g. de-germed whole-grain sorghum, is extruded from a single screw extruder at a temperature of at least 110 degrees Celsius, preferably at least 130 degrees Celsius, and at a pressure of at least 1800 pounds per square inch, preferably at least 2500 pounds per square inch, producing extruded pellets 84 used uncoated as absorbent granules 46 that each have at least some water soluble binder forming at least a portion of its outer surface 82 and containing at least 9% water soluble binder by uncoated absorbent granule weight. Such pellets 85 can be extruded from such a starch containing admixture preferably substantially completely formed of one or more such cereal grains with up to 40% and preferably no more than about 35% of the admixture being composed of cellulose or cellulosic material.

As discussed in more detail below, such an uncoated absorbent granule 46 formed of an uncoated pellet 84 extruded from such a starch-containing admixture as disclosed hereinabove by an extruder, preferably a single screw extruder, under the aforementioned extruder operating parameters and/or conditions produces uncoated absorbent granules 46 that are "dust magnets" by attracting and retaining at least a plurality of dust particles each having a size less than 100 microns. As discussed in more detail below, an uncoated absorbent granule absorbent granular blend component 78 of the present invention formed of at least a plurality of pairs, i.e., at least three, of uncoated absorbent granules 46 each formed of such an uncoated extruded pellet 84, picks up at least a plurality of pairs of such dust particles when mixed or otherwise blended together with at least a plurality of pairs of smectite absorbent granules 42 and/or at least a plurality absorbent-coated absorbent granules 44 to form a multicomponent blend, e.g., blend 40, of the present invention. As a result, and as also discussed in more detail below, the inclusion of at least a plurality of pairs of such "dust magnet" uncoated absorbent granules in such a multicomponent blend, e.g., blend 40, of the present significant inhibits the amount of dust in the blend, e.g., blend 40, when poured or otherwise agitated, shaken or the like advantageously providing significant airborne dust reduction.

Figure 10:
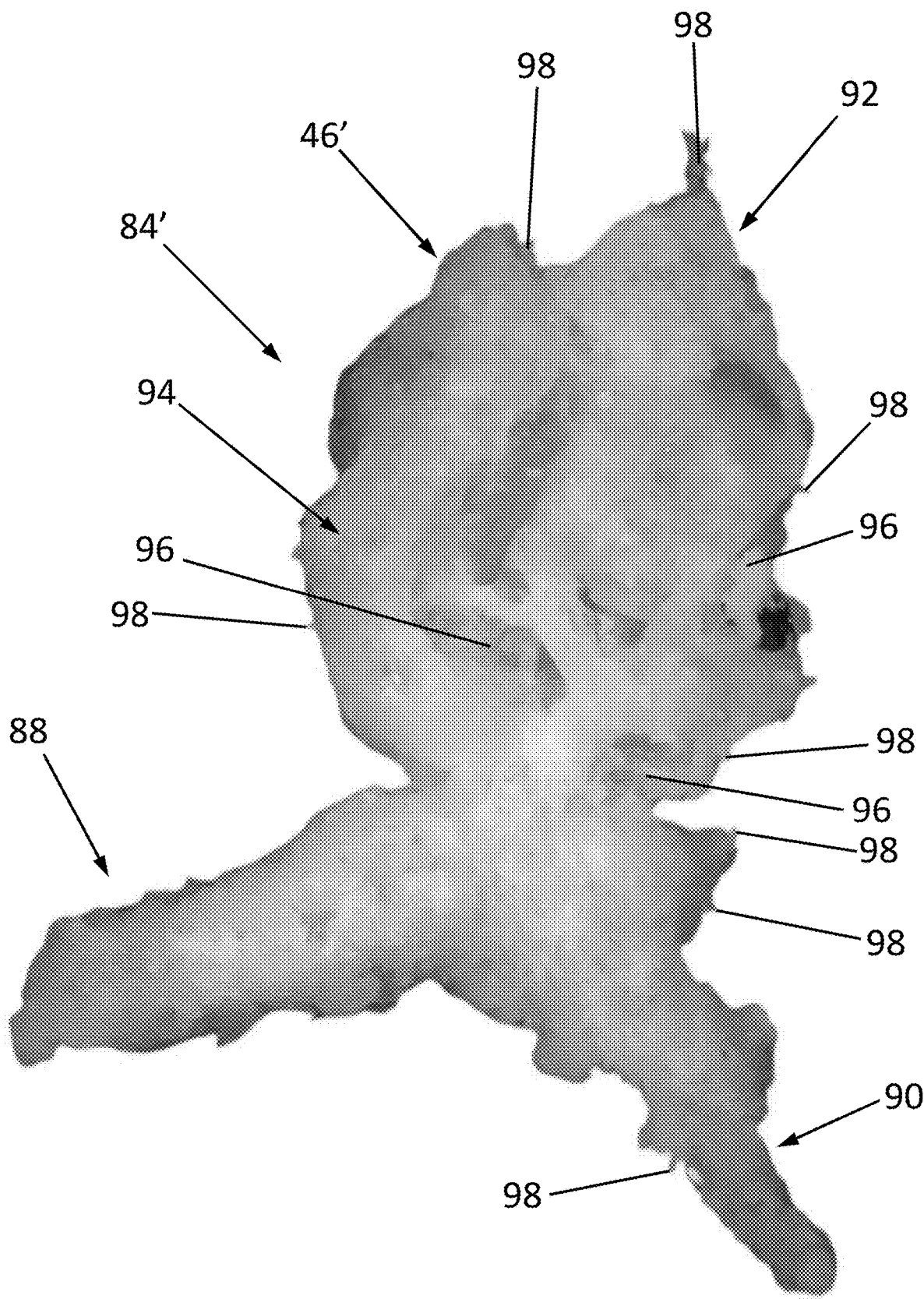
FIG. 10 is an enlarged color photograph of a splayed uncoated absorbent granule of the component of FIG. 7 formed of a splay-extruded uncoated pellet.

FIG. 10 illustrates another preferred embodiment of an uncoated absorbent granule 46' that is extruded of the same organic material using a similar or substantially same method of extrusion as uncoated absorbent granule 46 disclosed above and shown in FIG. 9 but which is extruded in a manner that opens up each pellet 84' during pellet splaying extrusion to form a splayed absorbent granule 46' having at least one elongate liquid-absorbing lobe 88 and preferably at least a plurality of elongate liquid-absorbing lobes 88, 90 extending outwardly from a porous and/or void filled body 92 of pellet 84' with each outwardly extending lobe 88 and/or 90 being narrower in width and being longer than wide.

Such a pellet 84' is splayed during extrusion in a manner that causes it to differ or deviate from a generally round, oval, oblong or cylindrical pellet 84 typically produced resulting instead in a splayed granule 46' that is non-uniform in shape, widened and/or flattened, as well as turned out, e.g., with at least a portion of the pellet interior 94 turned out or exposed, preferably thereby also causing flaring of the pellet 84' during pellet splaying extrusion that produces one or more outer extending lobes 88, 90. Such a pellet 84' resulting from pellet splaying extrusion also has a pellet body 92 with at least a portion of the pellet interior 94 turned out during pellet splaying extrusion thereby exposing at least a portion of the pellet interior 94 including thereby exposing at least a plurality of voids and/or pockets 96, each of which can be and preferably are air filled, which ordinarily would have been enclosed within or underneath the other surface of non-splayed pellet 84.

Each such lobe 88 and/or 90 formed during pellet splaying extrusion preferably has a width less than that of the body 92 of the splayed pellet 84' and which is at least greater than one-tenth the width of the body 92 of the splayed pellet 84'. Each such lobe 88 and/or 90 formed during pellet splaying extrusion preferably also has a length of at least one-fifth the length of the body 92 of splayed pellet 92' but preferably which is no greater than the length of the body of the pellet 92'. Each such lobe 88 and/or 90 can and preferably also does extend outwardly from the body 92 of pellet 92' at an angle, preferably an obtuse included angle, relative to a longitudinal or lengthwise extent of the pellet body 92.

With continued reference to FIG. 10, pellet splaying extrusion can and preferably also does produce one or more splayed pellets 84' which are fibrillated forming at least one and preferably at least a plurality of elongate but slender liquid-wicking tendrils 98 which are both shorter and narrower than lobes 88, 90 with each tendril 98 having a width of at least ½ μm but no greater than 500 μm and a length of at least ½ μm but no greater than 500 μm. In at least one preferred extruded fibrillated granular absorbent pellet embodiment, each fibrillated and splayed pellet 84' has at least a plurality of pairs of spaced apart liquid-wicking tendrils 98 that each have a width of at least ½ μm but no greater than 0.5 mm and a length projecting outwardly from the outer surface and/or body of the pellet 84' that is at least 1 μm long but no greater than 1 mm. In at least one other embodiment, each fibrillated and splayed pellet 84' has at least a plurality of pairs of spaced apart tendrils 98 that each have a width of at least 1 μm but no greater than 1 mm and a length projecting outwardly from the outer surface and/or body of the pellet 84' that is at least 1 μm but no greater than 1 mm.

Such a splayed pellet 84' advantageously possesses greater surface area than non-splayed pellet 84 such that each splayed uncoated granule 46' is able to more rapidly absorb liquid, e.g., water and/or oil, than non-splayed uncoated granule 46. Such a splayed pellet 84' with its lobes 88, 90 and/or fibrillated structure, e.g., tendrils 98, also helps prevent stratification when part of uncoated granular blend component 78 that is otherwise mixed or blended with one or more of the other components 50 and/or 52 in making a multicomponent blend, e.g., blend 40, in accordance with the invention because the lobes 88, 90 and/or tendrils 98 physically engage and/or electrostatically are attracted to one or more adjacent granules 42 and/or 46 of or in the multicomponent blend, e.g., in blend 40.

Figure 11:
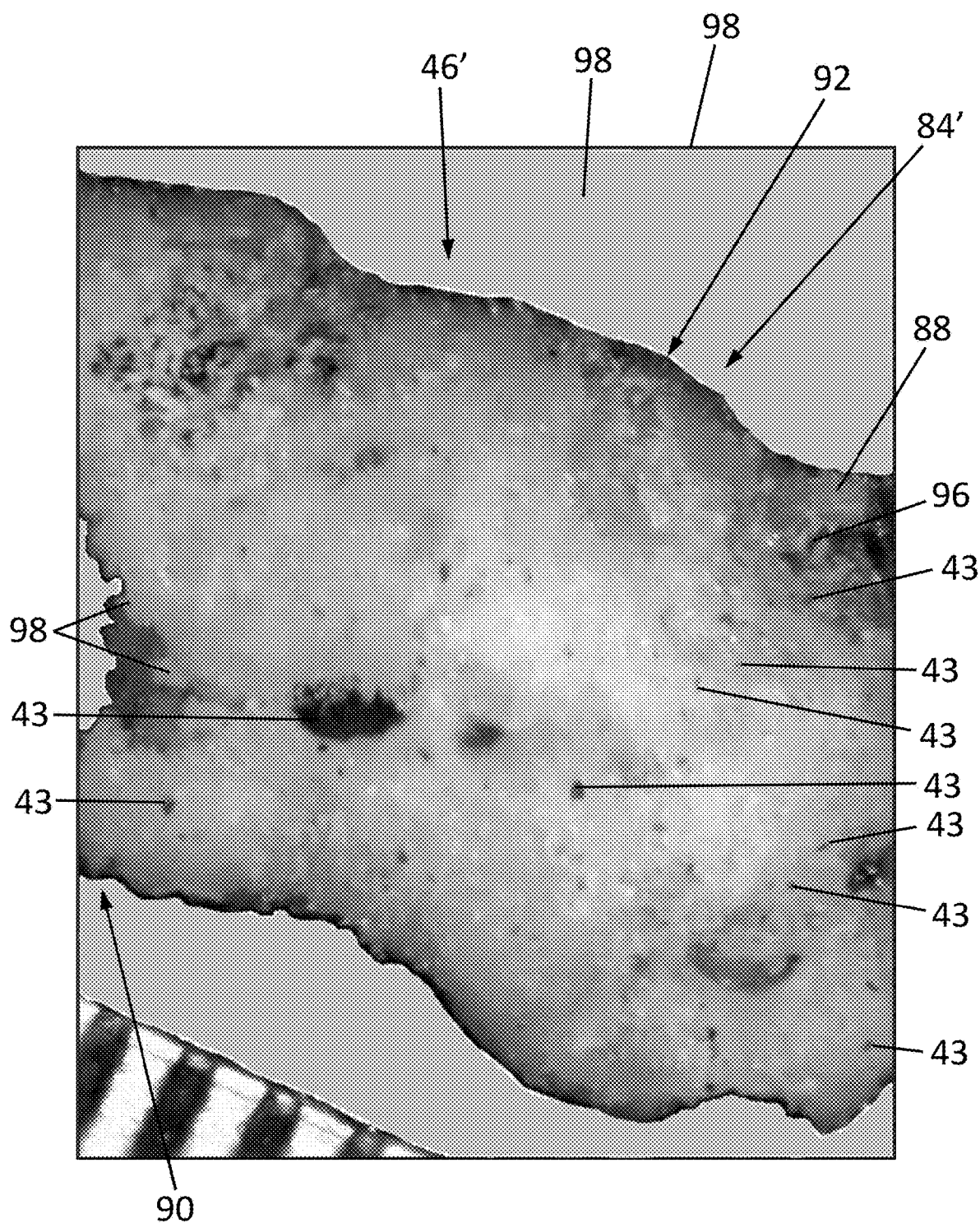
FIG. 11 is an enlarged color photograph of a portion of an uncoated absorbent granule of the component of FIG. 7 illustrating it functioning as a dust-adhering "dust magnet" uncoated absorbent granule formed of an uncoated extruded pellet.

FIG. 11 illustrates a portion of an uncoated absorbent granule that preferably is formed of an uncoated extruded pellet in accordance with that discussed above that has at least a plurality of pairs of dust particles 43 adhered thereto which preferably are bentonite dust particles 43 such as those typically found in absorbent granular blend component 50 formed of bentonite granules 42 and/or in absorbent-coated granule absorbent blend component 52 formed of absorbent coated granules 44. FIG. 11 also shows a portion of a 1/100 inch graduated scale or ruler 100 alongside uncoated absorbent granule formed of such an extruded pellet that preferably is a splayed extruded pellet 84' forming a splayed uncoated absorbent granule 46', pellet 84' and thusly granule 46' to provide a better perspective regarding the at least plurality of pairs, i.e., at least three bentonite dust particles 43 embedded in an outer surface of the pellet 84', e.g., granule 46' providing an exemplary but preferred embodiment of an extruded uncoated dust adhering pellet 102 of the present invention.

In a preferred multicomponent granular absorbent blend 40 of the present invention, the addition or inclusion of at least a plurality of pairs of such "dust magnet" dust-adhering uncoated absorbent granules 46 and/or 46' per cubic centimeter volume of the granular absorbent blend 40 each formed of an uncoated dust-adhering pellet 84 and/or 84' is advantageously capable of picking up at least 0.05 grams of dust particles 43 per gram of dust-adhering uncoated absorbent granule 46 and/or 46', preferably is capable of picking up at least 0.07 grams of dust particles 43 per gram of dust-adhering uncoated absorbent granule 46 and/or 46', and more preferably is capable of picking up at least 0.1 grams of dust per gram of dust-adhering uncoated absorbent granule 46 and/or 46'. In such a preferred multicomponent granular absorbent blend 40 of the present invention containing at least a plurality of pairs of such "dust magnet" dust adhering uncoated absorbent granules 46 and/or 46' per cubic centimeter volume of the granular absorbent blend 40 provides at least an 8%, preferably at least a 10%, and more preferably at least a 12% reduction in the amount of dust particles 43 which become airborne when granular absorbent blend 40 is poured for every 10% by weight of the granular absorbent blend that is formed of such "dust magnet" dust adhering uncoated absorbent granules 46.

In another preferred multicomponent granular absorbent blend 40 of the present invention, the addition or inclusion of at least a plurality of pairs of such "dust magnet" dust adhering uncoated absorbent granules 46 and/or 46' per cubic centimeter volume of the granular absorbent blend 40 that are each formed of an uncoated dust-adhering pellet 84 and/or 84' advantageously is capable of picking up at least 0.10 grams per gram of dust adhering uncoated absorbent granule 46 and/or 46' weight. In such a preferred multicomponent granular absorbent blend 40 of the present invention containing at least a plurality of pairs of such "dust magnet" dust adhering uncoated absorbent granules 46 and/or 46' per cubic centimeter volume of the granular absorbent blend 40 provides at least a 10% and preferably at least a 12% reduction in the amount of dust particles 43 which become airborne when granular absorbent blend 40 is poured for every 10% of the granular absorbent blend formed of such "dust magnet" dust adhering uncoated absorbent granules 46 by granular absorbent blend weight.

In still another preferred multicomponent granular absorbent blend 40 of the present invention, the addition or inclusion of at least a plurality of pairs of such "dust magnet" dust adhering uncoated absorbent granules 46 and/or 46' per cubic centimeter volume of the granular absorbent blend 40 that are each formed of an uncoated dust-adhering pellet 84 and/or 84' advantageously is capable of picking up at least 0.12 grams per gram of dust adhering uncoated absorbent granule 46 and/or 46' weight.

In such a preferred multicomponent granular absorbent blend 40 of the present invention containing at least a plurality of pairs of such "dust magnet" dust adhering uncoated absorbent granules 46 and/or 46' per cubic centimeter volume of the granular absorbent blend 40 provides at least a 10% and preferably at least a 12% reduction in the amount of dust particles 43 which become airborne when granular absorbent blend 40 is poured for every 10% of the granular absorbent blend formed of such "dust magnet" dust adhering uncoated absorbent granules 46 by granular absorbent blend weight.

The present invention is directed to a method of making a granular absorbent that is a blend of a plurality of different types of granular absorbents that reduces weight and cost of the resultant granular absorbent blend of the invention while advantageously producing a blended granular absorbent having improved properties. In a preferred method, implementation and embodiment of a blended granular absorbent in accordance with the present invention is well suited for use as animal or cat litter but it is contemplated that a blended granular absorbent or granular absorbent blend in accordance with the present invention could be used for other absorbent applications.

The present invention is directed to a blended granular absorbent and a method of making a blended granular absorbent where the granular absorbent blend is formed of at least a plurality of different granular absorbents blended together with at least one of the granular absorbents comprised of granules or particles of a smectite and at least another one of the other granular absorbents comprised of extrudate that preferably is in the form of extruded pellets, granules, and/or particles extruded from a starch admixture. The extrudate granular absorbent can be uncoated, or used "as is" out of the extruder, or can have an exterior or outer surface composed of a material different than the extrudate. Where the extrudate granular absorbent has an exterior composed of a material different than the extrudate, the exterior can be a film, coating, or layer of such material. Such an extrudate granular absorbent exterior material can also be or comprise a smectite, such as one or more of the smectites discussed in more detail herein.

In one embodiment, a blended granular absorbent in accordance with the present invention has a first type of granular absorbent providing at least a plurality of granules or particles per cubic centimeter volume of the blended granular absorbent that are comprised of one or more smectites and has a second type of granular absorbent providing at least plurality of granules or particles per cubic centimeter volume of the blended granular absorbent that are comprised of extrudate extruded from a starch admixture. In another embodiment, a blended granular absorbent in accordance with the present invention has a first type of granular absorbent providing at least a plurality of pairs of granules or particles per cubic centimeter volume of the blended granular absorbent that are comprised of one or more smectites and has a second type of granular absorbent providing at least plurality of granules or particles per cubic centimeter volume of the blended granular absorbent that are comprised of extrudate extruded from a starch admixture.

Preferred smectite(s) include one or more absorbent phyllosilicates(s) that can include or be composed of montmorillonite, nontronite, and/or trioctahedral smectites like saponite. Particularly preferred smectites include montmorillonite in the form of bentonite that can be sodium bentonite, calcium bentonite and/or potassium bentonite. Since the presently preferred smectite absorbent granules or particles are bentonite granules or particles, bentonite is used in the description of the method(s), composition(s), and blend(s) described below.

Preferred extrudates are extruded from a starch admixture formed of one or more cereal grains like corn, maize, wheat, triticale, amaranth and/or sorghum using a commercially available single screw or twin screw extruder including in accordance with that disclosed in commonly owned, U.S. application Ser. No. 13/842,534, the entire disclosure of which is hereby expressly incorporated herein by reference. The publication of the '534 application, U.S. Patent Application Publication No. US 2014/0069344 A1, is attached hereto as APPENDIX A, forming part of this provisional patent application.

In at least one preferred embodiment, the blended granular absorbent is formed of at least a plurality of pairs, i.e., at least three, of different granular absorbents with a first one of the granular absorbents comprised of granules or particles of bentonite, a second one of the of granular absorbents comprised of a first extrudate, and a third one of the of granular absorbents comprised of a second extrudate having an exterior comprised of a material different than the extrudate that can be in the form of a coating, film, or outer layer. Additional granular absorbents can be added to the blend if desired. In one such preferred blended granular absorbent embodiment, a first type of granular absorbent is comprised of bentonite, a second type of granular absorbent is comprised of granular extrudate extruded from a starch-containing mixture, and a third type of granular absorbent is comprised of granular extrudate extruded from a starch-containing mixture that has an exterior formed of a coating, film or outer layer comprised of bentonite. One or more other types of granular absorbents can be added to the blend if desired.

The bentonite granular absorbent is formed of at least a plurality of pairs, i.e., at least three, of bentonite granules or particles per cubic centimeter volume of the resultant blended granular absorbent of the present invention with each one or the bentonite granules or particles composed substantially completely of bentonite preferably being of substantially homogenous bentonite composition. In one such preferred bentonite granular absorbent, each one of the plurality of pairs of bentonite granules or particles per cubic centimeter volume of the resultant blended litter has a core of bentonite that forms at least 50% of each bentonite granule or particle. In another such preferred bentonite granular absorbent, each one of the plurality of pairs of bentonite granules or particles per cubic centimeter volume of the resultant blended litter preferably is substantially completely formed of bentonite such that at least 85% of each bentonite granule or particle is composed of bentonite. In another such preferred bentonite granular absorbent, each one of the plurality of pairs of bentonite granules or particles per cubic centimeter volume of the resultant blended litter preferably is substantially completely formed of bentonite such that at least 95% of each bentonite granule or particle is composed of bentonite.

Blended granular absorbent constructed in accordance with the present invention has at least a plurality of pairs, i.e. at least three, bentonite granules and/or particles per cubic centimeter of volume of the blended granular absorbent. The plurality of pairs of bentonite granules or particles of the bentonite granular absorbent per cubic centimeter volume of the blended granular absorbent of the present invention have a granule or particle size no greater than 8 mm and preferably have a granule or particle size no greater than about 5 mm. In one preferred embodiment, the plurality of pairs of bentonite granules or particles have a size no greater than about 6 mm and preferably range in size between about 0.1 mm and about 5 mm. In another preferred embodiment, the plurality of pairs of bentonite granules or particles have a size no greater than about 4.5 mm and preferably range in size of between about 0.1 mm and about 4 mm. In still another preferred embodiment, the plurality of pairs of bentonite granules or particles have a size no greater than about 3.5 mm and preferably range in size between about 0.1 mm and about 3 mm. Such bentonite granules or particles can be crushed, ground, pulverized or formed in a different manner having any one of a wide variety of shapes, e.g., round, cylindrical, diamond-shaped, cubic, square, rectangular, prismatic, etc.

The bentonite granules or particles can be composed of calcium bentonite, sodium bentonite, a combination of both calcium bentonite and sodium bentonite, but preferably include at least some sodium bentonite. In one preferred granular absorbent blend of the present invention, all or substantially all of the bentonite granules or particles are composed of sodium bentonite. If desired, all of the bentonite granules or particles can be composed of sodium bentonite.

Whether a blended granular absorbent made in accordance with the present invention has one or two extruded granular absorbents blended with the bentonite granular absorbent (also applicable to a blended granular absorbent of the invention where the blended granular absorbent includes one or more additional types of granular absorbents that are not extruded granular absorbents or bentonite granular absorbents), the blended granular absorbent has a bulk density no greater than 45 pounds per cubic feet and preferably has a bulk density less than 38 pounds per cubic feet making the blended granular absorbent lighter in weight than a conventional scoopable or pourable bentonite granular absorbent. In one blended granular absorbent made in accordance with the present invention, the mixing or blending of one or more types of extruded granular absorbents with a bentonite granular absorbent produces blended granular absorbent having a bulk density no greater than about 35 pounds per cubic feet. In another blended granular absorbent of the invention, mixing or blending one or more types of extruded granular absorbents with bentonite granular absorbent produces blended granular absorbent having a bulk density of between 20 pounds per cubic feet and 40 pounds per cubic feet. In a presently preferred blended granular absorbent of the invention, mixing or blending one or more types of extruded granular absorbents with bentonite granular absorbent produces blended lightweight granular absorbent having a bulk density between 24 pounds per cubic foot and 35 pounds per cubic foot.

Where blended granular absorbent of the invention is used as pet litter, animal litter or cat litter, the blended granular absorbent litter has a bulk density less than 45 pounds per cubic foot and preferably has a bulk density less than 38 pounds per cubic foot. In one preferred blended granular absorbent mixed or blended for use as a lightweight blended granular absorbent litter, the blended granular absorbent litter has a bulk density of between 24 pounds per cubic foot and 35 pounds per cubic foot.

The blending or mixing of one or more types of extruded granular absorbent with the bentonite granular absorbent advantageously produces a lightweight granular absorbent well suited for use as pet litter, animal litter or cat litter as it has a bulk density at least 15% less than conventional pourable or scoopable clay-based cat litter. Depending upon the ratio of the bentonite granular absorbent relative to the other types of granular absorbents of a granular absorbent blend in accordance with the present invention that includes one or more types of extruded granular absorbent(s), the resultant granular absorbent blend of the invention can have a bulk density between 30% and 70% less than the bulk density of conventional pourable or scoopable clay-based litter. Reductions in bulk density of between 40% and 60% are typical with a blended granular absorbent litter mixed or blended in accordance with the present invention producing a light weight granular absorbent litter that also advantageously performs substantially the same as conventional pourable or scoopable clay-based litter.

Such blended granular absorbent constructed in accordance with the present invention, including where used as lightweight litter, has at least a plurality of pairs, i.e. at least three, extruded uncoated pellets 84 and/or 84' and/or uncoated extruded granules 46 and/or 46' per cubic centimeter of volume of the blended granular absorbent. The plurality of pairs of extruded pellets, granules or particles of the blended granular absorbent per cubic centimeter volume of the blended granular absorbent of the present invention have a pellet, granule or particle size no greater than 8 mm and preferably have a pellet, granule or particle size no greater than about 5 mm. In one preferred embodiment, the plurality of pairs of extruded pellets, granules or particles have a size no greater than about 6 mm and preferably range in size between about 0.1 mm and about 5 mm. In another preferred embodiment, the plurality of pairs of extruded pellets, granules or particles have a size no greater than about 4.5 mm and preferably range in size of between about 0.1 mm and about 4 mm. In still another preferred embodiment, the plurality of pairs of extruded pellets, granules or particles have a size no greater than about 3.5 mm and preferably range in size between about 0.1 mm and about 3 mm. Such extruded pellets, granules or particles can have, e.g. be formed (such as by or during extrusion) into any one of a wide variety of shapes, e.g., round, cylindrical, diamond-shaped, cubic, square, rectangular, concave, convex, cup-shaped, prismatic, etc. and can be in the form of a flake if desired. It is contemplated that extruded granular absorbent used in mixing or blending a blended granular absorbent in accordance with the present invention be formed of a plurality or even a plurality of pairs of such shapes and sizes.

A blended granular absorbent litter of the present invention advantageously includes at least one granular absorbent of bentonite and at least extruded granular absorbent mixed or blended together in accordance with that defined herein producing a blended granular absorbent litter that maintains or even improves upon at least a plurality of the following properties to the litter as compared to a conventional pourable or scoopable clay-based litter: (1) segregation, separation and/or stratification prevention, (2) odor control and/or odor suppression, (3) litter box or litter pan adhesion, (4) dust suppression, (5) clumping, (6) clump retention, and (7) clump strength. Such a blended granular absorbent litter, whether made of two granular absorbents or constituents mixed or blended together, made of three granular absorbents or constituents mixed or blended together, or made of more than three granular absorbents or constituents mixed or blended together preferably is blended or mixed together in accordance with the formula and mixing/blending method set forth above and in FIG. 13.

The blending of one or more types of extruded granular absorbent(s) with bentonite granular absorbent produces a blended granular absorbent well suited for use as a granular absorbent litter of the present invention that has improved segregation, separation and/or stratification characteristics over conventional pourable or scoopable clay-based litters blended with conventional fillers because greater physical engagement and/or charge attraction occurs between the bentonite granular absorbent and the extruded granular absorbent(s). Increased or improved physical engagement between the bentonite granular absorbent and the extruded granular absorbent(s) occurs because at least some of the pellets, granules and/or particles of extruded granular absorbent(s) have an irregular, craggy, fibrillated, protrusion-containing, porous and/or relatively rough exterior or outer surface with at least a plurality of the extruded uncoated pellets 84 and/or 84' and/or uncoated extruded granules 46 and/or 46' having such a non-smooth outer surface with sufficient surface roughness to at least provide frictional contact and/or frictional engagement between adjacent pellets, granules and/or particles, including bentonite pellets, granules and/or particles that help prevent relative movement therebetween inhibiting segregation, separation and or stratification of the litter during packaging, storage, transport, warehousing, retail display, purchase and/or consumer use. In at least one blended granular absorbent embodiment well suited for use as litter, including lightweight litter, at least a plurality of pairs, i.e. at least three, of extruded uncoated pellets 84 and/or 84' and/or uncoated extruded granules 46 and/or 46' per cubic centimeter of volume of the blended granular absorbent litter are porous having at least a plurality of pairs, i.e., at least three, open pores, voids, pinholes, or holes, formed therein that produce a non-smooth extruded pellet, granule and/or particle outer surface. In at least one other blended granular absorbent embodiment well suited for use as litter, including lightweight litter, at least a plurality of pairs, i.e. at least three, of extruded uncoated pellets 84 and/or 84' and/or uncoated extruded granules 46 and/or 46' per cubic centimeter of volume of the blended granular absorbent litter are relatively rough having an outer surface with a surface roughness that produce a non-smooth extruded pellet, granule and/or particle outer surface. In at least one further blended granular absorbent embodiment well suited for use as litter, including lightweight litter, at least a plurality of pairs, i.e. at least three, of extruded uncoated pellets 84 and/or 84' and/or uncoated extruded granules 46 and/or 46' per cubic centimeter of volume of the blended granular absorbent litter are fibrillated, protrusion-containing and/or formed with hook-like arms that produce a non-smooth extruded pellet, granule and/or particle outer surface. In at least one additional blended granular absorbent embodiment well suited for use as litter, including lightweight litter, at least a plurality of pairs, i.e. at least three, of extruded uncoated pellets 84 and/or 84' and/or uncoated extruded granules 46 and/or 46' per cubic centimeter of volume of the blended granular absorbent litter possess a combination of two or more of (a) being porous, (b) possessing relatively high surface roughness, and/or (c) are fibrillated, protrusion-containing and/or formed with hook-like arms that produce or otherwise form a non-smooth extruded pellet, granule and/or particle outer surface. It is contemplated that a blended granular absorbent produced in accordance with the present invention, including such a blended granular absorbent well suited for use as litter, has at least a plurality of pairs of extruded uncoated pellets 84 and/or 84' and/or uncoated extruded granules 46 and/or 46' per cubic centimeter of volume of the blended granular absorbent that are (a) porous, (b) possess relatively high surface roughness, and (c) are fibrillated, e.g., tendrils, contain protrusions, and/or have outwardly extending hooks, e.g. hook-like and/or splayed arms, which facilitate engagement with adjacent bentonite and/or extruded uncoated pellets 84 and/or 84' and/or uncoated extruded granules 46 and/or 46' helping to prevent and preferably substantially minimize separation, segregation and/or stratification of the blended granular absorbent, e.g. lightweight blended granular absorbent litter, as discussed herein.

FIGS. 4-7 illustrate exemplary but preferred embodiments of a blended granular absorbent mixture made in accordance with the present invention that includes uncoated extruded granular absorbent granules or pellets extruded from or of a sorghum admixture, granules or particles of bentonite, as well as extruded granular absorbent granules or pellets extruded from or of a corn admixture where the extruded corn granules or pellets have been coated with bentonite. While FIGS. 4-7 illustrate a three-part or three constituent blended granular absorbent mixed or blended in accordance with the present invention, other preferred embodiments of a blended granular absorbent mixed or blended in accordance with the present invention contemplates using as few as two constituents with one of the constituents being granules, pellets or particles of bentonite and the other one of the constituents being either extruded uncoated granules, pellets and/or particles (such as the uncoated pellets shown above extruded of or from sorghum shown above) or extruded coated granules, pellets and/or particles that can be coated with bentonite (such as the extruded corn pellets coated with bentonite shown above).

With reference the extruded uncoated granular absorbent granules 84 and/or 84' and uncoated absorbent granules 46 and/or 46' disclosed herein and/or shown in any one or more of the FIGS. 8-11, in at least one multicomponent granular absorbent blend embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least 3 µm and preferably have a surface roughness greater than 6 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least 8 µm and preferably have a surface roughness greater than 12 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In still another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least 15 µm and preferably have a surface roughness greater than 20 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In a further blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least 24 µm and preferably have a surface roughness greater than 30 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least 35 µm and preferably have a surface roughness greater than 50 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification.

In at least one blended granular absorbent embodiment well suited for use as litter, at least a plurality of pairs of extruded uncoated pellets 84 and/or 84' and/or uncoated granules 46 and/or 46' per cubic centimeter of the litter have a surface roughness, Ra, of at least about 3.5 µm and preferably between 3 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In another blended granular absorbent embodiment well suited for use as litter, at least a plurality of pairs of extruded uncoated pellets and/or granules per cubic centimeter of the litter have a surface roughness, Ra, of at least about 5 μm and preferably between 4.5 μm and 100 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In still another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 7.5 μm and preferably between 7 μm and 75 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In a further blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 12 μm and preferably between about 10 μm and 50 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 20 μm and preferably between about 15 μm and 50 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification.

In at least one blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 3.5 μm and preferably between 3 μm and 50 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 5 μm and preferably between 4.5 μm and 75 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In still another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 7.5 μm and preferably between 7 μm and 100 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In a further blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 12 μm and preferably between about 10 μm and 125 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 20 μm and preferably between about 15 μm and 150 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification.

In at least one blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 3.5 μm and preferably between 3 μm and 30 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 5 μm and preferably between 4.5 μm and 45 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In still another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 7.5 μm and preferably between 7 μm and 50 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In a further granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 12 μm and preferably between about 10 μm and 60 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 20 μm and preferably between about 15 μm and 85 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification.

In at least one blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 3.5 μm and preferably between 3 μm and 500 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 5 μm and preferably between 4.5 μm and 500 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In still another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 7.5 μm and preferably between 7 μm and 500 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In a further blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 12 μm and preferably between about 10 μm and 500 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 20 μm and preferably between about 15 μm and 500 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 25 μm and preferably between about 20 μm and 500 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 35 μm and preferably between about 30 μm and 500 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 45 μm and preferably between about 40 μm and 500 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 55 μm and preferably between about 55 μm and 500 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 65 μm and preferably between about 60 μm and 500 μm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 75 µm and preferably between about 70 µm and 500 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 85 µm and preferably between about 80 µm and 500 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 95 µm and preferably between about 90 µm and 500 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 105 µm and preferably between about 100 µm and 500 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification.

In at least one blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 3.5 µm and preferably between 3 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 5 µm and preferably between 4.5 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In still another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 7.5 µm and preferably between 7 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In a further blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 12 µm and preferably between about 10 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 20 µm and preferably between about 15 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 25 µm and preferably between about 20 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 35 µm and preferably between about 30 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 45 µm and preferably between about 40 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 55 µm and preferably between about 55 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 65 µm and preferably between about 60 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 75 µm and preferably between about 70 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 85 µm and preferably between about 80 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 95 µm and preferably between about 90 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 105 µm and preferably between about 100 µm and 300 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification.

In at least one blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 3.5 µm and preferably between 3 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 5 µm and preferably between 4.5 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In still another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 7.5 µm and preferably between 7 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In a further blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 12 µm and preferably between about 10 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 20 µm and preferably between about 15 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 25 µm and preferably between about 20 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 35 µm and preferably between about 30 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 45 µm and preferably between about 40 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 55 µm and preferably between about 55 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 65 µm and preferably between about 60 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 75 µm and preferably between about 70 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 85 µm and preferably between about 80 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 95 µm and preferably between about 90 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 105 µm and preferably between about 100 µm and 250 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification.

In at least one blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 3.5 µm and preferably between 3 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 5 µm and preferably between 4.5 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In still another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 7.5 µm and preferably between 7 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In a further blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 12 µm and preferably between about 10 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 20 µm and preferably between about 15 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 25 µm and preferably between about 20 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 35 µm and preferably between about 30 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 45 µm and preferably between about 40 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 55 µm and preferably between about 55 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 65 µm and preferably between about 60 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 75 µm and preferably between about 70 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 85 µm and preferably between about 80 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 95 µm and preferably between about 90 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification. In yet another blended granular absorbent embodiment well suited for use as litter, at least a plurality of pairs of extruded uncoated pellets 84 and/or 84' and/or uncoated extruded granules 46 and/or 46' per cubic centimeter of the litter have a surface roughness, Ra, of at least about 105 µm and preferably between about 100 µm and 150 µm providing surface roughness sufficient to facilitate engagement between adjacent pellets, granules and/or particles, including adjacent bentonite granular absorbent pellets, granules and/or particles as well as adjacent extruded pellets, granules and/or particles, thereby reducing segregation, separation, and/or stratification.

FIG. 9 illustrates a plurality of extruded uncoated granular absorbent pellets 84 of around construction having a surface roughness in accordance with at least one of the requirements, maximum surface roughness, and/or surface roughness ranges specified above. Such pellets 84 can be used in a multicomponent blend of extruded sorghum pellets and bentonite granules with all of the pellets exhibiting considerable surface roughness such that at least the extruded sorghum pellets have a surface roughness with at least one of the requirements, maximum surface roughness, and/or surface roughness ranges specified above.

Such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably rough outer surface that it reduces segregation, separation, and/or stratification by at least 10% compared to conventional pourable or scoopable clay-based litters having one or more of the fillers discussed above in the introduction section herein. Another such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably rough outer surface that it reduces segregation, separation, and/or stratification by at least 25% compared to conventional pourable or scoopable clay-based litters having one or more of the fillers discussed above in the introduction section herein. Still further such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably rough outer surface that it reduces segregation, separation, and/or stratification by at least 35% compared to conventional pourable or scoopable clay-based litters having one or more of the fillers discussed above in the introduction section herein. Other such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably rough outer surface that it reduces segregation, separation, and/or stratification by at least 45% compared to conventional pourable or scoopable clay-based litters having one or more of the fillers discussed above in the introduction section herein. Further such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably rough outer surface that it reduces segregation, separation, and/or stratification by at least 50% compared to conventional pourable or scoopable clay-based litters having one or more of the fillers discussed above in the introduction section herein. Other such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably rough outer surface that it reduces segregation, separation, and/or stratification by at least 60% compared to conventional pourable or scoopable clay-based litters having one or more of the fillers discussed above in the introduction section herein. Still additional such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably rough outer surface that it reduces segregation, separation, and/or stratification by at least 75% compared to conventional pourable or scoopable clay-based litters having one or more of the fillers discussed above in the introduction section herein.

Where having such pores, voids, pinholes and/or holes, at least a plurality of pairs of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.01% and no greater than 75% of the narrowest extent, i.e. width, length or diameter, of the extruded pellet, granule and/or particle in which the pores, voids, pinholes and/or holes are formed. In another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.1% and no greater than 75% of the narrowest extent, i.e. width, length or diameter, of the extruded pellet, granule and/or particle in which the pores, voids, pinholes and/or holes are formed. In still another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.2% and no greater than 75% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 1% and no greater than 75% of the narrowest extent, i.e. width, length or diameter, of the extruded pellet, granule and/or particle in which the pores, voids, pinholes and/or holes are formed. In still yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 2% and no greater than 75% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 4% and no greater than 75% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 5% and no greater than 75% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 7% and no greater than 75% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 10% and no greater than 75% of the narrowest extent, i.e. width, length or diameter, of the extruded pellet, granule and/or particle in which the pores, voids, pinholes and/or holes are formed.

Where having such pores, voids, pinholes and/or holes, at least least a plurality of pairs of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.01% and no greater than 60% of the narrowest extent, i.e. width, length or diameter, of the extruded pellet, granule and/or particle in which the pores, voids, pinholes and/or holes are formed. In another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.1% and no greater than 60% of the narrowest extent, i.e. width, length or diameter, of the extruded pellet, granule and/or particle in which the pores, voids, pinholes and/or holes are formed. In still another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.2% and no greater than 60% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 1% and no greater than 60% of the narrowest extent, i.e. width, length or diameter, of the extruded pellet, granule and/or particle in which the pores, voids, pinholes and/or holes are formed. In still yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 2% and no greater than 60% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 4% and no greater than 60% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 5% and no greater than 60% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 7% and no greater than 60% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 10% and no greater than 60% of the narrowest extent, i.e. width, length or diameter, of the extruded pellet, granule and/or particle in which the pores, voids, pinholes and/or holes are formed.

Where having such pores, voids, pinholes and/or holes, at least least a plurality of pairs of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.01% and no greater than 40% of the narrowest extent, i.e. width, length or diameter, of the extruded pellet, granule and/or particle in which the pores, voids, pinholes and/or holes are formed. In another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.1% and no greater than 40% of the narrowest extent, i.e. width, length or diameter, of the extruded pellet, granule and/or particle in which the pores, voids, pinholes and/or holes are formed. In still another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.2% and no greater than 40% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 1% and no greater than 40% of the narrowest extent, i.e. width, length or diameter, of the extruded pellet, granule and/or particle in which the pores, voids, pinholes and/or holes are formed. In still yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 2% and no greater than 40% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 4% and no greater than 40% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 5% and no greater than 40% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 7% and no greater than 40% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 10% and no greater than 40% of the narrowest extent, i.e. width, length or diameter, of the extruded pellet, granule and/or particle in which the pores, voids, pinholes and/or holes are formed.

Where having such pores, voids, pinholes and/or holes, at least a plurality of pairs of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter no greater than 25% of the narrowest extent, i.e. width, length or diameter, of the extruded pellet, granule and/or particle in which the pores, voids, pinholes and/or holes are formed. In another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter no greater than 10% of the narrowest extent, i.e. width, length or diameter, of the extruded pellet, granule and/or particle in which the pores, voids, pinholes and/or holes are formed. In still another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter no greater than 5% of the narrowest extent, i.e. width, length or diameter, of the extruded pellet, granule and/or particle in which the pores, voids, pinholes and/or holes are formed.

Where having such pores, voids, pinholes and/or holes, at least least a plurality of pairs of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.01% and no greater than 25% of the narrowest extent, i.e. width, length or diameter, of the extruded pellet, granule and/or particle in which the pores, voids, pinholes and/or holes are formed. In another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.1% and no greater than 25% of the narrowest extent, i.e. width, length or diameter, of the extruded pellet, granule and/or particle in which the pores, voids, pinholes and/or holes are formed. In still another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.2% and no greater than 25% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 1% and no greater than 25% of the narrowest extent, i.e. width, length or diameter, of the extruded pellet, granule and/or particle in which the pores, voids, pinholes and/or holes are formed. In still yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 2% and no greater than 25% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 4% and no greater than 25% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 5% and no greater than 25% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 7% and no greater than 25% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 10% and no greater than 25% of the narrowest extent, i.e. width, length or diameter, of the extruded pellet, granule and/or particle in which the pores, voids, pinholes and/or holes are formed.

Where having such pores, voids, pinholes and/or holes, at least least a plurality of pairs of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.01% and no greater than 15% of the narrowest extent, i.e. width, length or diameter, of the extruded pellet, granule and/or particle in which the pores, voids, pinholes and/or holes are formed. In another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.1% and no greater than 15% of the narrowest extent, i.e. width, length or diameter, of the extruded pellet, granule and/or particle in which the pores, voids, pinholes and/or holes are formed. In still another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 0.2% and no greater than 15% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 1% and no greater than 15% of the narrowest extent, i.e. width, length or diameter, of the extruded pellet, granule and/or particle in which the pores, voids, pinholes and/or holes are formed. In still yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 2% and no greater than 15% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 4% and no greater than 15% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 5% and no greater than 15% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 7% and no greater than 15% of the narrowest extent, i.e. width, length or diameter, of the extruded pellet, granule and/or particle in which the pores, voids, pinholes and/or holes are formed. In yet another blended granular absorbent embodiment well suited for use as lightweight litter, at least a plurality of pores, voids, pinholes and/or holes formed in at least a plurality of pairs of extruded uncoated pellets 84 and/or 84' and/or uncoated extruded granules 46 and/or 46' per cubic centimeter of litter have an opening width or diameter of at least 10% and no greater than 15% of the narrowest extent, i.e. width, length or diameter, of the extruded pellet, granule and/or particle in which the pores, voids, pinholes and/or holes are formed.

Such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably porous (and/or rough and/or fibrillated/projection-containing) outer surface that it reduces segregation, separation, and/or stratification by at least 10% compared to conventional pourable or scoopable clay-based litters having one or more of the fillers discussed above in the introduction section herein. Another such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably porous outer surface that it reduces segregation, separation, and/or stratification by at least 25% compared to conventional pourable or scoopable clay-based litters having one or more of the fillers discussed above in the introduction section herein. Still further such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably porous outer surface that it reduces segregation, separation, and/or stratification by at least 35% compared to conventional pourable or scoopable clay-based litters having one or more of the fillers discussed above in the introduction section herein. Other such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably porous outer surface that it reduces segregation, separation, and/or stratification by at least 45% compared to conventional pourable or scoopable clay-based litters having one or more of the fillers discussed above in the introduction section herein. Further such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably porous outer surface that it reduces segregation, separation, and/or stratification by at least 50% compared to conventional pourable or scoopable clay-based litters having one or more of the fillers discussed above in the introduction section herein. Other such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably porous outer surface that it reduces segregation, separation, and/or stratification by at least 60% compared to conventional pourable or scoopable clay-based litters having one or more of the fillers discussed above in the introduction section herein. Still additional such preferred blended granular absorbent embodiment(s) well suited for use as litter, including lightweight litter, at least a plurality of pairs, i.e., at least three, of extruded uncoated pellets 84 and/or 84' and/or uncoated extruded granules 46 and/or 46' per cubic centimeter of volume of the blended granular absorbent can and preferably do have such a suitably porous outer surface that it reduces segregation, separation, and/or stratification by at least 75% compared to conventional pourable or scoopable clay-based litters having one or more of the fillers discussed above in the introduction section herein.

With reference to FIG. 10 once again, wherein at least one of the types of extruded granular absorbent constituents used in making a blended granular absorbent mixture in accordance with the present invention includes extruded fibrillated pellets, each fibrillated pellet can be and preferably is constructed in accordance with that described above. In at least one preferred blended granular absorbent mixture of the present invention, at least a plurality of cubic centimeters of volume of the blended granular absorbent mixture includes at least a plurality of pairs of fibrillated pellets. In one such preferred blended granular absorbent mixture, each cubic centimeter volume of the blended granular absorbent mixture has at least one fibrillated pellet. In another such preferred blended granular absorbent mixture, each cubic centimeter volume of the blended granular absorbent mixture has a plurality of fibrillated pellets. In still another such preferred blended granular absorbent mixture, cubic centimeter of volume of the blended granular absorbent mixture has at least a plurality of pairs of fibrillated pellets.

The resultant blended granular absorbent mixture produced by blending or mixing a plurality of granular absorbents with at least one of the granular absorbents comprised of a cement tight such as bentonite and at least one other granular absorbent comprised of an extruded cereal grain-based absorbent in accordance with the present invention produces a blended granular absorbent mixture well suited for use as pet, animal a cat litter that is of lightweight litter construction having absorption substantially the same as that of a conventional clay based litter which has improved order suppression over conventional clay based litter, suppresses dust better than conventional clay based litter, clumps more rapidly than clay based litter, produces clumps having greater clump retention then played base litter, and forms clumps having greater clump strength than clay based litter. In addition, such a resultant blended granular absorbent mixture also forms clumps that do not substantially adhere to sidewalls and/or a bottom wall of a litter pan or box in which the blended granular absorbent mixture is used when blended granular absorbent mixture of the present invention is used as cat litter.

It should be appreciated that a blended granular absorbent mixture produced in accordance with the present invention can be used in other liquid, oil/hydrocarbon, solvent, and waste disposal applications.

Where the blended granular absorbent of the present invention includes a third granular absorbent formed of pellets, granules or particles of extrudate extruded from starch admixture, the third granular absorbent provides a plurality of pellets, granules or particles per cubic centimeter of the blended granular absorbent also extruded from starch admixture producing extruded uncoated pellets 84 and/or 84' and/or uncoated extruded granules 46 and/or 46' possessing sufficient water soluble binder when wetted that flowable granular absorbent clumping adhesive is produced that flows between and around adjacent particles, granules and/or pellets of the blended granular absorbent causing them to self-clump together. In one embodiment, extrudate of the third granular absorbent provides at least a plurality of pairs of pellets, granules or particles per cubic centimeter of the blended granular absorbent that are extruded from starch admixture producing extruded uncoated pellets 84 and/or 84' and/or uncoated extruded granules 46 and/or 46' possessing sufficient water soluble binder when wetted that flowable granular absorbent clumping adhesive is produced that flows between and around adjacent particles, granules and/or pellets of the blended granular absorbent causing them to self-clump together. This is true even when extruded uncoated pellets 84 and/or 84' and/or uncoated extruded granules 46 and/or 46' of the third granular absorbent have an exterior comprised of, covered or otherwise coated with a material different than the extrudate, including where the exterior is comprised of, covered by or otherwise coated with a smectite that can be and preferably is bentonite or comprised of bentonite.

The extrudate of the second granular absorbent provides at least a plurality of pellets, granules or particles per cubic centimeter of the blended granular absorbent that are extruded from starch admixture producing extruded uncoated pellets 84 and/or 84' and/or uncoated extruded granules 46 and/or 46' possessing sufficient water soluble binder when wetted that flowable granular absorbent clumping adhesive is produced that flows between and around adjacent particles, granules and/or pellets of the blended granular absorbent causing them to self-clump together. In one embodiment, extrudate of the second granular absorbent provides at least a plurality of pairs of pellets, granules or particles per cubic centimeter of the blended granular absorbent that are extruded from starch admixture producing extruded uncoated pellets 84 and/or 84' and/or uncoated extruded granules 46 and/or 46' possessing sufficient water soluble binder when wetted that flowable granular absorbent clumping adhesive is produced that flows between and around adjacent particles, granules and/or pellets of the blended granular absorbent causing them to self-clump together.

Where the blended granular absorbent of the present invention includes a third granular absorbent formed of pellets, granules or particles of extrudate extruded from starch admixture, the third granular absorbent provides a plurality of pellets, granules or particles per cubic centimeter of the blended granular absorbent also extruded from starch admixture producing extruded uncoated pellets 84 and/or 84' and/or uncoated extruded granules 46 and/or 46' possessing sufficient water soluble binder when wetted that flowable granular absorbent clumping adhesive is produced that flows between and around adjacent particles, granules and/or pellets of the blended granular absorbent causing them to self-clump together. In one embodiment, extrudate of the third granular absorbent provides at least a plurality of pairs of pellets, granules or particles per cubic centimeter of the blended granular absorbent that are extruded from starch admixture producing extruded uncoated pellets 84 and/or 84' and/or uncoated extruded granules 46 and/or 46' possessing sufficient water soluble binder when wetted that flowable granular absorbent clumping adhesive is produced that flows between and around adjacent particles, granules and/or pellets of the blended granular absorbent causing them to self-clump together. This is true even when extruded uncoated pellets 84 and/or 84' and/or uncoated extruded granules 46 and/or 46' of the third granular absorbent have an exterior comprised of, covered or otherwise coated with a material different than the extrudate, including where the exterior is comprised of, covered by or otherwise coated with a smectite that can be and preferably is bentonite or comprised of bentonite.

Extruded granular absorbent constituent(s) of the blended granular absorbent of the present invention including producing starch based litter by extrusion and high starch granules or pellets (hereinafter "pellets") produced by extrusion that are well suited for use as animal litter. The pellets can be used by themselves as litter or can be subjected to one or more treatment steps after extrusion including one or more post-extrusion treatment steps that applies a coating to the pellets. The litter pellets are extruded from a high-carbohydrate admixture having at least 45% carbohydrates by pellet weight and a relatively low moisture content of less than 15% by pellet weight producing pellets each having a water-soluble carbohydrate polymer binder disposed about their outer surface that can form at least part of the outer surface of each pellet that reacts to water and urine by dissolving and promoting pellet clumping thereby adhesively bonding adjacent pellets together such that the pellets are self-clumping when wetted. An admixture from which litter pellets in accordance with the present invention are extruded is a high starch admixture having at least having at least 45% starch by admixture weight and a relatively low moisture content of less than 20% by admixture weight producing extruded pellets each having a water-soluble carbohydrate polymer binder at least some of which is disposed about the outer surface of each pellet that can form at least part of the outer surface of each pellet that reacts to water and urine by dissolving and promoting pellet clumping by adhesively bonding adjacent pellets together. In one post-extrusion pellet treatment, a water-absorptive coating that can include a smectite, such as bentonite, is applied after extrusion.

The present invention is directed to a multicomponent granular absorbent blend comprising: a dust-containing or dust-forming blend component having a plurality of pairs of absorbent granules each comprised of a dust-containing or dust-forming liquid absorbent material, and a dust-suppressing blend component having a plurality of pairs of dust-adhering absorbent granules each comprised of an organic liquid absorbent material to which dust particles formed of dust-containing or dust-forming liquid absorbent material adhere; and wherein the plurality of pairs of dust-adhering absorbent granules each pick up at least a plurality of pairs of dust particles in the multicomponent granular absorbent blend thereby reducing the amount or number of the dust particles in the multicomponent granular absorbent blend which can become airborne. The multicomponent blend wherein the plurality of pairs of dust-adhering absorbent granules of the dust-suppressing blend component are each comprised of an organic liquid absorbing material. The multicomponent blend wherein the plurality of pairs of dust-adhering absorbent granules of the dust-suppressing blend component are each comprised of a splayed liquid absorbent pellet having a plurality of elongate liquid absorbing lobes extending outwardly from a splayed pellet body larger than each lobe. The multicomponent blend wherein each splayed liquid absorbent pellet is further comprised of at least a plurality of elongate liquid wicking tendrils extending outwardly from at least one of the lobes and splayed pellet body with each liquid wicking tendril smaller in size than each lobe and the splayed pellet body. The multicomponent blend wherein each splayed liquid absorbent pellet is extruded of or from a starch-containing material. The multicomponent blend wherein each splayed liquid absorbent pellet is extruded substantially completely of or from at least one cereal grain. The multicomponent blend wherein each splayed liquid absorbent pellet is further comprised of cellulose. The multicomponent blend wherein the at least one cereal grain comprises sorghum. The multicomponent blend wherein each splayed liquid absorbent pellet is extruded substantially completely of or from sorghum. The multicomponent blend wherein each splayed liquid absorbent pellet is further comprised of cellulose. The multicomponent blend wherein each splayed liquid absorbent pellet is extruded substantially completely of or from whole grain sorghum. The multicomponent blend wherein each splayed liquid absorbent pellet is extruded substantially completely of or from de-germed whole grain sorghum. The multicomponent blend wherein each one of the plurality of dust-adhering absorbent granules of the dust-suppressing blend component are formed of splayed liquid absorbent extruded pellets used uncoated. The multicomponent blend wherein the plurality of pairs of the absorbent granules of the dust-containing or dust-forming blend component are each formed substantially completely of or from the dust-containing or dust-forming liquid absorbent material. The multicomponent blend wherein the dust-containing or dust-forming liquid absorbent material is a smectite material. The multicomponent blend wherein the dust-containing or dust-forming liquid absorbent material comprises a bentonite. The multicomponent blend wherein each one of the plurality of dust-adhering absorbent granules of the dust-suppressing blend component are formed of splayed liquid absorbent extruded pellets used uncoated as extruded. The multicomponent blend wherein the plurality of pairs of the absorbent granules the dust-containing or dust-forming blend component are each formed substantially completely of or from the dust-containing or dust-forming liquid absorbent material. The multicomponent blend wherein the plurality of pairs of the absorbent granules of the dust-containing or dust-forming blend component are each formed substantially completely of or from the dust-containing or dust-forming liquid absorbent material. The multicomponent blend wherein the dust-containing or dust-forming liquid absorbent material is a smectite material. The multicomponent blend wherein the dust-containing or dust-forming liquid absorbent material comprises a bentonite. The multicomponent blend wherein the plurality of pairs of the absorbent granules of the dust-containing or dust-forming blend component are each formed substantially completely of or from the dust-containing or dust-forming liquid absorbent material. The multicomponent blend wherein the dust-containing or dust-forming liquid absorbent material is a smectite material. The multicomponent blend wherein the dust-containing or dust-forming liquid absorbent material comprises a bentonite. The multicomponent blend of wherein the plurality of pairs of the absorbent granules of the dust-containing or dust-forming blend component are each formed substantially completely of or from the dust-containing or dust-forming liquid absorbent material. The multicomponent blend wherein the dust-containing or dust-forming liquid absorbent material is a smectite material. The multicomponent blend wherein the dust-containing or dust-forming liquid absorbent material comprises a bentonite. The multicomponent blend wherein the plurality of pairs of the absorbent granules of the dust-containing or dust-forming blend component are each formed of an inner core having a bulk density less than the dust-containing or dust-forming liquid absorbent material at least partially covered by an outer layer comprised of the dust-containing or dust-forming liquid absorbent material. The multicomponent blend wherein the plurality of pairs of dust-adhering absorbent granules of the dust-suppressing blend component are each comprised of an organic liquid absorbing material. The multicomponent blend wherein the plurality of pairs of dust-adhering absorbent granules of the dust-suppressing blend component are each comprised of a splayed liquid absorbent pellet having a plurality of elongate liquid absorbing lobes extending outwardly from a splayed pellet body larger than each lobe. The multicomponent blend wherein each splayed liquid absorbent pellet is further comprised of at least a plurality of elongate liquid wicking tendrils extending outwardly from at least one of the lobes and splayed pellet body with each liquid wicking tendril smaller in size than each lobe and the splayed pellet body. The multicomponent blend wherein each splayed liquid absorbent pellet is extruded of or from a starch-containing material. The multicomponent blend wherein each splayed liquid absorbent pellet is extruded substantially completely of or from at least one cereal grain. The multicomponent blend wherein the outer layer at least partially covering each inner core of each absorbent granule of the dust-containing or dust-forming blend component is comprised of smectite. The multicomponent blend wherein the outer layer at least partially covering each inner core of each absorbent granule of the dust-containing or dust-forming blend component is comprised of bentonite. The multicomponent blend wherein the inner core of each one of the plurality of pairs of absorbent granules of the dust-containing or dust-forming blend component is comprised of an organic liquid absorbing material. The multicomponent blend wherein the inner core of each one of the plurality of pairs of absorbent granules of the dust-containing or dust-forming blend component is comprised of an extruded pellet. The multicomponent blend wherein the inner core of each one of the plurality of pairs of absorbent granules of the dust-containing or dust-forming blend component is comprised of a pellet extruded of or from at least one cereal grain. The multicomponent blend wherein the inner core of each one of the plurality of pairs of absorbent granules of the dust-containing or dust-forming blend component is further comprised of cellulose. The multicomponent blend wherein the inner core of each one of the plurality of pairs of absorbent granules of the dust-containing or dust-forming blend component is comprised of a pellet extruded substantially completely of or from corn. The multicomponent blend wherein the inner core of each one of the plurality of pairs of absorbent granules of the dust-containing or dust-forming blend component is further comprised of cellulose. The multicomponent blend comprising a plurality of the dust-containing or dust-forming blend components each having a plurality of pairs of absorbent granules each comprised of a dust-containing or dust-forming liquid absorbent material with the plurality of pairs of absorbent granules of a first one of the dust-containing or dust-forming blend components each substantially completely formed of dust-containing or dust-forming liquid absorbent material and the plurality of pairs of absorbent granules of a second one of the dust-containing or dust-forming blend components each having an inner core having a bulk density less than the dust-containing or dust-forming liquid absorbent material at least partially covered by an outer layer of the dust-containing or dust-forming liquid absorbent material. The multicomponent blend wherein the plurality of pairs of dust-adhering absorbent granules of the dust-suppressing blend component are each comprised of an organic liquid absorbing material. The multicomponent blend wherein the plurality of pairs of dust-adhering absorbent granules of the dust-suppressing blend component are each comprised of a splayed liquid absorbent pellet having a plurality of elongate liquid absorbing lobes extending outwardly from a splayed pellet body larger than each lobe. The multicomponent blend wherein each splayed liquid absorbent pellet is further comprised of at least a plurality of elongate liquid wicking tendrils extending outwardly from at least one of the lobes and splayed pellet body with each liquid wicking tendril smaller in size than each lobe and the splayed pellet body. The multicomponent blend wherein each splayed liquid absorbent pellet is extruded of or from a starch-containing material. The multicomponent blend wherein the inner core of each one of the plurality of pairs of absorbent granules of the dust-containing or dust-forming blend component is comprised of an organic liquid absorbing material. The multicomponent blend wherein the inner core of each one of the plurality of pairs of absorbent granules of the dust-containing or dust-forming blend component is comprised of an extruded pellet. The multicomponent blend wherein the inner core of each one of the plurality of pairs of absorbent granules of the dust-containing or dust-forming blend component is comprised of a pellet extruded of or from at least one cereal grain. The multicomponent blend wherein the inner core of each one of the plurality of pairs of absorbent granules of the dust-containing or dust-forming blend component is further comprised of cellulose. The multicomponent blend wherein the outer layer at least partially covering each inner core of each absorbent granule of the dust-containing or dust-forming blend component is comprised of smectite. The multicomponent blend wherein the outer layer at least partially covering each inner core of each absorbent granule of the dust-containing or dust-forming blend component is comprised of bentonite. The multicomponent blend wherein each one of the plurality of pairs of absorbent granules of a first one of the dust-containing or dust-forming blend components is substantially completely formed of or from smectite. The multicomponent blend wherein each one of the plurality of pairs of absorbent granules of a first one of the dust-containing or dust-forming blend components is substantially completely formed of or from bentonite.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention as defined by the claims set forth below.

What is claimed is:

1. A multicomponent granular absorbent blend comprising:
    (a) a dust-containing or dust-forming blend component comprised of a plurality of pairs of dust-containing or dust-forming liquid-absorbent granules each composed of one of a dust-containing liquid-absorbent material and a dust-forming liquid-absorbent material, each dust-containing or dust-forming liquid-absorbent granule comprised of a plurality of smaller dust particles which can become airborne; and
    (b) a dust-suppressing blend component comprised of a plurality of pairs of dust-adhering liquid-absorbent granules, each dust-adhering liquid-absorbent granule in the form of an extruded pellet consisting essentially of a starch-containing organic material and containing a water-soluble binder formed of or from starch during pellet extrusion in an amount sufficient to form a clump of the dust-adhering liquid-absorbent pellets and the dust-containing or dust-forming liquid-absorbent granules when wetted with water or a liquid comprised of water.

2. The multicomponent blend of claim 1, wherein each extruded dust-adhering liquid-absorbent pellet is substantially completely composed of the starch-containing organic material and contains no dust containing or dust forming material when extruded.

3. The multicomponent blend of claim 1, wherein each extruded dust-adhering liquid-absorbent pellet consists of the starch-containing organic material.

4. The multicomponent blend of claim 1, wherein the extruded dust-adhering liquid-absorbent pellets are extruded substantially completely of at least one cereal grain.

5. The multicomponent blend of claim 1, wherein the extruded dust-adhering liquid-absorbent pellets each contain at least 7.5% of the water soluble binder by pellet weight.

6. The multicomponent blend of claim 1, wherein the extruded dust-adhering liquid-absorbent pellets are extruded from an admixture consisting essentially of the starch-containing organic material at an extrusion temperature of at least 100° C. and at an extrusion pressure of at least 1500 PSI forming the water soluble binder from starch during pellet extrusion in the amount sufficient to form a clump of the dust-adhering liquid-absorbent granules and the dust-containing or dust-forming liquid-absorbent granules when wetted with water or a liquid comprised of water.

7. The multicomponent blend of claim 6, wherein the extruded dust-adhering liquid-absorbent pellets each contain at least 7.5% of the water soluble binder by pellet weight.

8. The multicomponent blend of claim 1, wherein the extruded dust-adhering liquid-absorbent pellets have a dust carrying or dust pickup capacity of at least 0.07 grams of dust particles per gram thereof, the dust particles having a size no greater than 100 microns.

9. The multicomponent blend of claim 1, wherein the multicomponent blend is comprised of a weight percentage of the extruded dust-adhering liquid-absorbent pellets, and wherein each weight percent of the extruded dust-adhering liquid-absorbent pellets in the multicomponent blend reduces the number or amount of the dust particles in the multicomponent blend which can become airborne during use of the multicomponent blend by at least 0.5%.

10. The multicomponent blend of claim 1, wherein the extruded dust-adhering liquid-absorbent pellets are used in the multicomponent blend in their as-extruded form.

11. The multicomponent blend of claim 1, wherein each one of the dust-containing or dust-forming liquid-absorbent granules are comprised of a smectite.

12. The multicomponent blend of claim 11, wherein each one of the dust-containing or dust-forming liquid-absorbent granules are comprised of a bentonite.

13. The multicomponent blend of claim 12, wherein each one of the dust-containing or dust-forming liquid-absorbent granules are comprised of sodium bentonite.

14. The multicomponent blend of claim 1, wherein the dust-adhering liquid-absorbent pellets absorb (i) at least three times their own weight in water, and (ii) at least one and one-half times their own weight in oil.

15. The multicomponent blend of claim 1, further comprising a second dust-containing or dust-forming blend component comprised of a plurality of dust-containing or dust-forming granules each comprised of (i) a pellet extruded from a starch-containing admixture, and (ii) an outer layer covering each extruded pellet comprised of a dust-containing or dust-forming material.

16. The multicomponent blend of claim 15, wherein each extruded pellet of the dust-containing or dust-forming granules of the second dust-containing or dust-forming blend component is comprised of a water soluble binder formed of or from starch in the starch-containing admixture during pellet extrusion, and the dust-containing or dust-forming material of the outer layer covering each extruded pellet is comprised of one of a smectite and a bentonite.

17. The multicomponent blend of claim 16, wherein the dust-containing or dust-forming material of the outer layer covering each extruded pellet is comprised of sodium bentonite.

18. A multicomponent granular absorbent blend comprising:
  (a) a dust-containing or dust-forming blend component comprised of a plurality of pairs of dust-containing or dust-forming liquid-absorbent granules each composed of one of a dust-containing liquid-absorbent material and a dust-forming liquid-absorbent material, each dust-containing or dust-forming liquid-absorbent granule comprised of a plurality of smaller dust particles formed of the dust-containing liquid-absorbent material and a dust-forming liquid-absorbent material which can become airborne; and
  (b) a dust-suppressing blend component comprised of a plurality of pairs of dust-adhering liquid-absorbent granules, each dust-adhering liquid-absorbent granule in the form of an extruded pellet that (i) is composed substantially completely of a starch-containing organic material, (ii) contains a water-soluble binder formed of or from starch during pellet extrusion in an amount sufficient to form a clump of the dust-adhering liquid-absorbent pellets and the dust-containing or dust-forming liquid-absorbent granules when wetted with water or a liquid comprised of water, and (ii) does not have any dust containing or dust forming material when extruded.

19. The multicomponent blend of claim 18, wherein each extruded dust-adhering liquid-absorbent pellet consists essentially of the starch-containing organic material and contains no dust containing or dust forming material.

20. The multicomponent blend of claim 18, wherein each extruded dust-adhering liquid-absorbent pellet consists of the starch-containing organic material.

21. The multicomponent blend of claim 18, wherein the extruded dust-adhering liquid-absorbent pellets are extruded substantially completely of at least one cereal grain.

22. The multicomponent blend of claim 18, wherein the extruded dust-adhering liquid-absorbent pellets each contain at least 7.5% of the water soluble binder by pellet weight.

23. The multicomponent blend of claim 18, wherein the extruded dust-adhering liquid-absorbent pellets are extruded from an admixture consisting essentially of the starch-containing organic material at an extrusion temperature of at least 100° C. and at an extrusion pressure of at least 1500 PSI forming the water soluble binder from starch during pellet extrusion in the amount sufficient to form a clump of the dust-adhering liquid-absorbent granules and the dust-containing or dust-forming liquid-absorbent granules when wetted with water or a liquid comprised of water.

24. The multicomponent blend of claim 23, wherein the extruded dust-adhering liquid-absorbent pellets each contain at least 7.5% of the water soluble binder by pellet weight.

25. The multicomponent blend of claim 18, wherein the extruded dust-adhering liquid-absorbent pellets have a dust carrying or dust pickup capacity of at least 0.07 grams of dust particles per gram thereof, the dust particles having a size no greater than 100 microns.

26. The multicomponent blend of claim 18, wherein the multicomponent blend is comprised of a weight percentage of the extruded dust-adhering liquid-absorbent pellets, and wherein each weight percent of the extruded dust-adhering liquid-absorbent pellets in the multicomponent blend reduces the number or amount of the dust particles in the multicomponent blend which can become airborne during use of the multicomponent blend by at least 0.5%.

27. The multicomponent blend of claim 18, wherein the extruded dust-adhering liquid-absorbent pellets are used in the multicomponent blend in their as-extruded form.

28. The multicomponent blend of claim 18, wherein each one of the dust-containing or dust-forming liquid-absorbent granules are comprised of a smectite.

29. The multicomponent blend of claim 28, wherein each one of the dust-containing or dust-forming liquid-absorbent granules are comprised of a bentonite.

30. The multicomponent blend of claim 29, wherein each one of the dust-containing or dust-forming liquid-absorbent granules are comprised of sodium bentonite.

31. The multicomponent blend of claim 18, wherein the dust-adhering liquid-absorbent pellets absorb (i) at least three times their own weight in water, and (iia) at least one and one-half times their own weight in oil.

32. The multicomponent blend of claim 18, further comprising a second dust-containing or dust-forming blend component comprised of a plurality of dust-containing or dust-forming granules each comprised of (i) a pellet extruded from a starch-containing admixture, and (ii) an outer layer covering each extruded pellet comprised of a dust-containing or dust-forming material.

33. The multicomponent blend of claim 32, wherein each extruded pellet of the dust-containing or dust-forming granules of the second dust-containing or dust-forming blend component is comprised of a water soluble binder formed of or from starch in the starch-containing admixture during pellet extrusion, and the dust-containing or dust-forming material of the outer layer covering each extruded pellet is comprised of one of a smectite and a bentonite.

34. The multicomponent blend of claim 33, wherein the dust-containing or dust-forming material of the outer layer covering each extruded pellet is comprised of sodium bentonite.

35. A multicomponent granular absorbent blend comprising:
  (a) a dust-containing or dust-forming blend component comprised of a plurality of pairs of dust-containing or dust-forming liquid-absorbent granules each comprised of a bentonite, each dust-containing or dust-forming liquid-absorbent granule comprised of a plurality of smaller dust particles comprised of bentonite which can become airborne; and
  (b) a dust-suppressing blend component comprised of a plurality of pairs of dust-adhering liquid-absorbent granules, each dust-adhering liquid-absorbent granule in the form of an extruded pellet consisting of a starch-containing organic material extruded from a starch-containing organic admixture at an extrusion temperature of at least 100° C. and an extrusion pressure of at least 1500 PSI forming at least 7.5% water-soluble binder by pellet weight of or from starch during extrusion that is an amount sufficient to form a clump of the dust-adhering liquid-absorbent pellets and the dust-containing or dust-forming liquid-absorbent granules when wetted with water or a liquid comprised of water.

36. The multicomponent blend of claim 35, wherein each one of the dust-containing or dust-forming liquid-absorbent granules are comprised of sodium bentonite.

* * * * *